(12) United States Patent
Wieder

(10) Patent No.: US 6,827,569 B2
(45) Date of Patent: Dec. 7, 2004

(54) MOLD VENT AND METHOD

(76) Inventor: Klaus A. Wieder, W3877 Scheel La., Helenville, WI (US) 53137

(*) Notice: Subject to any disclaimer, the term of this patent is extended or adjusted under 35 U.S.C. 154(b) by 289 days.

(21) Appl. No.: 10/109,428

(22) Filed: Mar. 28, 2002

(65) Prior Publication Data

US 2002/0100860 A1 Aug. 1, 2002

Related U.S. Application Data

(63) Continuation-in-part of application No. 09/392,698, filed on Sep. 9, 1999, now Pat. No. 6,367,765.

(51) Int. Cl.[7] .............................................. B29C 45/34
(52) U.S. Cl. ...................................... 425/130; 425/812
(58) Field of Search ................................. 425/130, 812

(56) References Cited

U.S. PATENT DOCUMENTS

| | | |
|---|---|---|
| 1,000,470 A | 8/1911 | Widmann |
| 2,959,814 A | 11/1960 | Budd |
| 3,486,551 A | 12/1969 | Inoue |
| 3,555,620 A | 1/1971 | Bucy |
| 3,572,421 A | 3/1971 | Mezey et al. |
| 3,703,762 A | 11/1972 | Lind |
| 3,941,528 A | 3/1976 | Cotterell |
| 3,963,209 A | 6/1976 | Muller |
| 3,982,870 A | 9/1976 | Boden et al. |
| 3,991,971 A | 11/1976 | Drake |
| 4,000,561 A | 1/1977 | Wieder et al. |
| 4,009,978 A | 3/1977 | Hanning |
| 4,023,268 A | 5/1977 | Momchilov |
| 4,026,512 A | 5/1977 | Holt |
| 4,081,225 A | 3/1978 | Yaita |
| 4,091,069 A * | 5/1978 | Allen ........................... 425/812 |
| 4,123,218 A | 10/1978 | Krall |
| 4,137,962 A | 2/1979 | Pol |
| 4,165,062 A | 8/1979 | Mitchell |
| 4,280,976 A | 7/1981 | von Holdt |
| 4,315,727 A | 2/1982 | Black |
| 4,337,027 A | 6/1982 | Montieth |

(List continued on next page.)

FOREIGN PATENT DOCUMENTS

| | | |
|---|---|---|
| DE | 197 30 772 | 1/1998 |
| DE | 197 01 025 | 6/1998 |
| DE | 93 14 975 | 12/1998 |
| WO | WO 89 02831 | 4/1989 |

OTHER PUBLICATIONS

Mold–Making Handbook 2nd Edition, Hanser Publishers, 2nd Edition, pp. 94,95.*
Witzler, Suzy, "The 10 Most Common Mistakes Made by Molders," *Injection Molding*, pp. 15–16 and 18, Sep. 1993.
Gurr, Amanda, "Breathing Steel Prevents Trapped Gas," *Injection Molding*, p. 49 51, Jan. 1995.
Rosen, Mark, "Correcting an Out–of–Balance Family Mold," *Injection Molding*, pp. 66–67, Oct. 1995.

(List continued on next page.)

*Primary Examiner*—Tim Heitbrink
(74) *Attorney, Agent, or Firm*—Boyle, Fredrickson, Newholm, Stein & Gratz, S.C.

(57) ABSTRACT

A mold vent and method. The vent has expanding passages. A preferred vent comprises an insert that has a plurality of passages. One insert comprises a grate formed of a plurality of portions that interleave fingers forming vent passages therebetween that preferably are vent slots. Supports can be disposed between fingers. The grate preferably is discharge-machined from a blank cut from stock made material that preferably is non-porous and smooth. The grate can be mounted in a pocket in the mold cavity or carried by a movable pin. The grate can be used in a system that includes valving, a source of fluid, and, if needed, a source of vacuum to help facilitate venting by drawing atmosphere out of the cavity during molding. The grate can also be used to introduce fluid into the mold that can be foaming moldable material or a heat transfer medium.

42 Claims, 17 Drawing Sheets

U.S. PATENT DOCUMENTS

| | | |
|---|---|---|
| 4,352,388 A | 10/1982 | Perrella |
| 4,384,702 A | 5/1983 | Boskovic |
| 4,420,446 A | 12/1983 | Wieder et al. |
| 4,436,497 A | 3/1984 | Dahl et al. |
| 4,447,197 A | 5/1984 | Bartley et al. |
| 4,487,564 A | 12/1984 | Von Holdt |
| 4,524,899 A | 6/1985 | Hirabayashi |
| 4,531,703 A | 7/1985 | Underwood |
| 4,547,333 A | 10/1985 | Takada |
| 4,645,446 A | 2/1987 | Hehl |
| 4,708,314 A | 11/1987 | Kuhling |
| 4,716,953 A | 1/1988 | Prunty, II et al. |
| 4,721,279 A | 1/1988 | Oleszko et al. |
| 4,765,585 A | 8/1988 | Wieder |
| 4,795,331 A | 1/1989 | Cain et al. |
| 4,842,508 A | 6/1989 | Boskovic |
| 4,874,308 A | 10/1989 | Atlas et al. |
| 4,889,311 A | 12/1989 | Anglin |
| 4,909,725 A | 3/1990 | Ward |
| 4,946,363 A | 8/1990 | Cavender |
| 4,952,132 A | 8/1990 | Lunquist |
| 4,990,077 A | 2/1991 | Morita |
| 4,995,445 A | 2/1991 | Shigyo |
| 5,044,921 A | 9/1991 | Micelli et al. |
| 5,059,380 A | 10/1991 | Wise et al. |
| 5,097,864 A | 3/1992 | Myers et al. |
| 5,108,532 A | 4/1992 | Thein et al. |
| 5,151,282 A | 9/1992 | Dray |
| 5,204,050 A | 4/1993 | Loren |
| 5,208,053 A | 5/1993 | Vandenberg |
| 5,250,314 A | 10/1993 | Jones |
| 5,282,730 A | 2/1994 | Daniels et al. |
| 5,304,058 A | 4/1994 | Gill |
| 5,340,303 A | 8/1994 | Maus et al. |
| 5,356,284 A | 10/1994 | Sheffield |
| 5,368,468 A | 11/1994 | Boskovic |
| 5,397,230 A | 3/1995 | Brew |
| 5,397,231 A | 3/1995 | Bald |
| 5,421,544 A | 6/1995 | Roop |
| 5,421,716 A | 6/1995 | Gellert |
| 5,435,023 A | 7/1995 | Wagner et al. |
| 5,443,778 A | 8/1995 | Schlingman |
| 5,472,334 A | 12/1995 | Takahashi |
| 5,484,278 A | 1/1996 | Berdan |
| 5,494,435 A | 2/1996 | Vandenberg |
| 5,546,647 A | 8/1996 | Pruna |
| 5,560,708 A | 10/1996 | Takizawa et al. |
| 5,562,150 A | 10/1996 | Shimmell |
| 5,586,596 A | 12/1996 | Freeman |
| 5,587,183 A | 12/1996 | Clark et al. |
| 5,597,525 A | 1/1997 | Koda et al. |
| 5,607,640 A | 3/1997 | Hendry |
| 5,624,693 A | 4/1997 | Horling et al. |
| 5,626,887 A | 5/1997 | Chou et al. |
| 5,665,281 A | 9/1997 | Drummond |
| 5,683,730 A | 11/1997 | Katsumata et al. |
| 5,730,812 A | 3/1998 | Lawrence |
| 5,730,926 A * | 3/1998 | Matsumoto et al. ........ 425/130 |
| 5,762,977 A | 6/1998 | Boskovic |
| 5,769,554 A | 6/1998 | Slocum |
| 5,800,642 A | 9/1998 | Ohya |
| 5,824,350 A | 10/1998 | Wietrzynski |
| 5,830,515 A | 11/1998 | Pleasant et al. |
| 5,849,343 A | 12/1998 | Gellert et al. |
| 5,869,105 A | 2/1999 | Murphy et al. |
| 5,874,116 A | 2/1999 | Takano |
| 5,879,726 A | 3/1999 | Hsing |
| 5,902,512 A | 5/1999 | Streit |
| 5,913,356 A | 6/1999 | Muramatsu |
| 6,042,354 A | 3/2000 | Loren |
| 6,042,361 A | 3/2000 | Murphy |
| 6,164,953 A | 12/2000 | Winget |
| 6,280,176 B1 | 8/2001 | Boyce et al. |
| 6,298,904 B2 | 10/2001 | Polich |
| 6,308,929 B1 | 10/2001 | Wieder |
| 6,367,765 B1 | 4/2002 | Wieder |

OTHER PUBLICATIONS

Hatch, Bob, "The Troubleshooter Part II: Mold Venting," *Injection Molding*, pp. 76–77, 79 and 81, Feb. 1997.

Hatch, Bob, "The Troubleshooter Part 28: Polycarbonate Molding Problems," *Injection Molding*, (immnet.com), Dec. 1998.

"Sintered Vents Relieve Trapped Gas," D–M–E Co., product brochure, 1998.

D–M–E Standard Sintered Vents for Plastics Injection Molding and Diecasting, product information, Jul. 1999.

Carley, Dr. James F., "A Plastics Primer," Modern Plastics Encyclopedia, p. 4, 1989.

Scholz, Dieter and H. Bernd Amecke, "Foaming Agents," Modern Plastics Encyclopedia, p. 166, 1989.

Shannon, J.E., "Foam Processing: Expandable PS Foam Molding," Modern Plastics Encyclopedia, p. 254, 1989.

D–M–E Standard Runner Shut–Off Inserts detail sheet, p. K–28.5, undated.

D–M–E Standard Runner Shut–Off Inserts detail sheet, p. K–28.6, undated.

D–M–E Standard Mold Dating Inserts detail sheet, undated.

D–M–E Standard Straight Side Interlocks detail sheet, undated.

D–M–E Standard Tapered Interlocks (round) detail sheet, undated.

D–M–E Standard Tapered Interlocks (rectangular) detail sheet, undated.

D–M–E Standard Self–Lubricating Wear Ways detail sheet, Sep. 1998.

VanderLaan, Robert A., "Wear Testing of Side Locks," pp. 1–6, Mar. 22, 1999.

Progressive Components brochure, pp. 99B/1–99B/2, 1999.

*Progress report*, Feb. 1999 pp. 1–2.

"Sorting Out Oilless Bearings," *Machine Design*, pp. 58, 60, 61 and 64, Sep. 25, 1986.

Progressive Components advertising postcard, undated.

Progressive Components side locks, x–series, detail sheet, p. 25, undated.

SelfLube online products catalog, Dec. 8, 2001.

Release problems information sheet, undated.

* cited by examiner

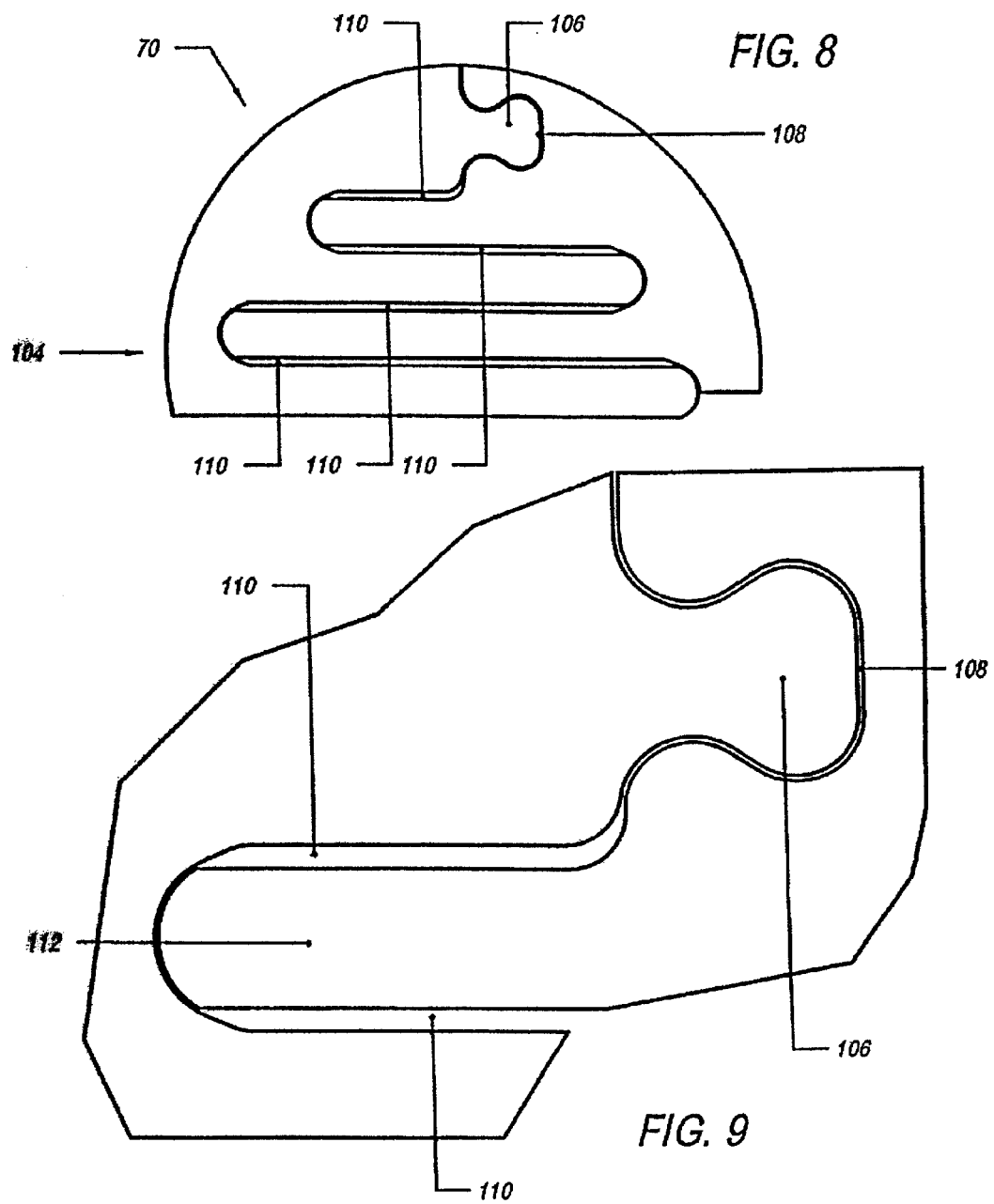

MOLD VENT AND METHOD

CROSS REFERENCE TO RELATED APPLICATION

This application is a continuation-in-part application of Ser. No. 09/392,698, filed Sep. 9, 1999, which issued Apr. 9, 2002, as U.S. Pat. No. 6,367,765, and which is entitled "Mold Vent" the entirety of which is incorporated herein by reference.

FIELD OF THE INVENTION

The present invention relates to a mold vent and and more particularly to a mold vent insert and method of making the insert.

BACKGROUND OF THE INVENTION

During molding, the atmosphere inside the mold cavity must somehow be vented from the mold cavity to avoid the air in the mold cavity, along with gases from the mold material, from causing defects in the part being molded. If the trapped air is not vented from the mold cavity quickly enough or not vented at all, the finished part can have defects. For example, trapped air can impart knit lines or poor surface cosmetics in the exterior of the finished part. Even worse, gases from the mold material can migrate into the mold material creating porosity or bubbles in the finished part.

Venting also has an impact on how fast parts can be molded. It stands to reason that the faster air and other gases in the mold cavity can be vented from the cavity, the faster the mold cavity can be filled. Conversely, when defects occur because venting is poor or virtually nonexistent, the rate of injecting the hardenable mold material into the cavity is often significantly reduced rather dramatically slowing production. Thus, not only can venting related problems lead to defective finished parts that must be scrapped, these problems can also significantly reduce production, which is also costly.

The reason that venting-related defects occur so frequently is that venting is not well understood and that venting is neither cheap nor easy. For example, vents typically require rather precise machining to create a vent passage or orifice in the mold cavity and a passageway that leads from the orifice away from the cavity. Machining the orifice particularly requires skill because the orifice must be wide enough to allow gas in the cavity to enter but small enough to stop the mold material from entering the orifice and plugging.

Unfortunately, machined-in-place vents, such as core pin vents, ejector pin vents, perimeter vents, and circumference vents, can have problems. One problem that commonly results from machined vents is that volatile gases from the mold material can condense at the narrowest portion of the vent, typically the orifice or passage, plugging the vent. This usually is because the orifice is too narrow and does not increase in cross-sectional size for a great length until it connects to the passageway. As a result, the pressure of the volatile gases is increased in the orifice while it is simultaneously cooled causing some of the gases to condense and plug the vent. If the condensate doesn't completely plug the vent, it can partially obstruct the vent, rendering the vent effectively useless and requiring the vent to be periodically cleaned. Even if not rendered useless, a partially plugged vent can lead to one or more of the vent-related molding problems previously discussed.

Another problem with machining these vents is that if precise tolerances are maintained during machining, the resulting vent will not perform properly and may have to be filled and re-machined. For example, if an orifice is off by as little as two one-thousandths of an inch (0.002"), the vent will either be too large and allow mold material to enter the orifice plugging the vent or be too narrow leading to one or more of the above-identified vent-related problem.

In an attempt to overcome these problems, it is known to utilize a one-piece sintered vent insert received in a pocket in the mold that is in gas flow communication with the passage. Unfortunately, the sintering process creates uneven vent surfaces, has pores that are not parallel, and has corners. Any corner or deviation from straight or smooth means that the gases being vented do not travel along a straight line causing them to condense.

Another type of vent, a parting line vent, typically suffers from other problems. For example, the flowing molding material can impact against the interior surface adjacent the parting line vent with such force that it can dent or peen the interior surface. This can lead to surface irregularities in the finished part. If the dents extend too far into the vent, the mold material can enter the vent creating unwanted flash that must be trimmed. Of course, any additional operation that must be performed costs money and requires labor, both of which are undesirable. Moreover, because of the peening, that part of the mold must be periodically resurfaced to restore the integrity of the mold surface so future finished parts will have a better surface finish and no flash.

What is needed is an improved vent arrangement.

OBJECTS AND SUMMARY OF THE INVENTION

A mold vent and system that can control flow of a fluid to and from a mold that has a mold cavity into which a hardenable or moldable material is introduced and molded. In one preferred embodiment, the vent of the present invention comprises a plurality of perforations or orifices, each of which preferably is oblong in shape. The vent of the present invention can comprise an insert received in a pocket in the mold cavity or carried by a pin. In another preferred vent embodiment, the vent comprises a reciprocable pin that has clearance between its head and the mold cavity providing a vent passage therebetween. In preferred methods, the system can be used to withdraw atmosphere from the mold cavity, introduce fluid into the mold cavity, or vent atmosphere from the mold cavity before introducing a fluid into the mold cavity.

The fluid can comprise a gas or mixture of gases, such as air, a vapor, such as steam or another vapor, a combination thereof, as well as a liquid. In its preferred embodiment, gas or vapor is directed through the vent. The hardenable or moldable material preferably includes any material, which can be molded or formed in a mold. Examples of such material include plastic, metal, or a metallic material that is introduced into the mold cavity and which is flowable while in the cavity during molding.

Each orifice of a vent is constructed to permit fluid flow of gas or vapor while preventing flow of hardenable material. Each orifice communicates with a vent passage that in turn leads to a vent passageway. So that fluid flowing through an orifice will not condense inside, each orifice has a narrow entrance adjacent the mold cavity that opens into the passage into an expansion chamber downstream. In one preferred embodiment, each orifice is oblong or slot-shaped. As a result of this construction, the venting surface area is increased, which advantageously enables atmosphere within a mold cavity to be more quickly vented permitting faster mold cycle times to be achieved.

The vent can be made as an insert. Such a vent insert communicates with a larger passageway and can be disposed in a pocket or the like. A preferred insert has orifices that are slots. In one preferred embodiment, the insert has at least three slots. Each slot is oblong and narrow in width. Each slot opens in the mold cavity and preferably communicates with a vent passage in the insert that has an enlarged chamber spaced from its opening. This enlarged chamber reduces the pressure of that which is vented from the cavity after it has passed through the narrower opening to prevent condensation at the opening or in the vent passage. In one preferred embodiment, the slot has a width of between 0.005 inches and 0.0005 inches to permit gas and vapor flow while obstructing the hardenable material.

In one preferred insert construction, the insert is a slotted grate. The grate is comprised of two halves, with each grate half having recesses that separate and define fingers. In one preferred assembly, each finger of one grate half is received in a recess in the other grate half and vice versa. At least some adjacent fingers of the assembled vent grate are spaced slightly apart, defining vent slots between them. To help strengthen the vent grate, the end of each finger preferably bears against an adjacent recess endwall that preferably is slanted or inclined so it acts like shelf to support the finger. If desired, one or more fingers can have outwardly extending tabs or ridges that provide support.

In one preferred insert assembly, the grate halves are retained by engagement. For example, one grate half preferably is constructed with at least one key and the other grate half preferably is constructed with at least one keyway that receives the key to retain the grate halves together. In one preferred construction, one grate half has a pair of spaced apart keys and the other grate half has a pair of spaced apart keyways.

If desired, the insert can be press fit or welded to fix it in place. Where the insert is press fit, the pocket has a sidewall that engages the insert to retain the insert in the pocket. Where the insert is welded, the insert is first placed in the pocket and then welded, preferably about its periphery. Where the insert is welded, a high energy density welding process preferably is used. In another preferred arrangement for securing the insert, the sidewall defining the pocket has an inturned portion, preferably a lip, which is deformed around the insert after placing the insert in the pocket.

In one preferred method of making the vent grate of this invention, wafers of discs are cut from stock. Individual wafers or discs are then machined or cut, preferably using a discharge machining process, such as wire EDM, to form the recesses, fingers, keys and keyways. Where it is desired to increase the hardness of the vent grate, each wafer or disc can be hardened before the recesses and fingers are formed.

In another preferred vent, the vent comprises a pin, such as an ejector pin, that has a head smaller than the rest of it. The smaller head provides a clearance between it and the sidewall defining the bore in which the pin is received to permit gas or vapor to flow therebetween to a passage. The clearance preferably is between about 0.005 inches and about 0.0005 inches to enable gas or vapor to flow while preventing flow of hardenable material. To prevent condensation, the head preferably has a necked down region spaced from its head. The necked down region serves as an expansion chamber that reduces the pressure downstream of the mouth of the clearance and prevents condensation.

In a system and method of controlling mold cavity fluid flow, the system includes valving, a source of fluid under pressure, and can include a source of vacuum. The fluid preferably is a gas, a vapor, or a liquid capable of flowing through a mold vent. In one preferred method, a vacuum is created to accelerate removal of atmosphere from within the mold cavity through a vent to help speed molding. In another preferred method, fluid is injected through a vent into the mold cavity after a part has been molded to help separate the part from the mold. In still another preferred method, fluid, such as a foaming agent, is injected through a vent into the hardenable material while it is in a moldable state. In a further method, a heated medium, such as steam, can be introduced into the mold cavity through a vent to heat hardenable material in the cavity. In still a further preferred implementation, atmosphere is removed from the mold cavity through a vent using a vacuum during one part of the mold cycle and fluid is introduced through the vent during another part of the mold cycle.

It is an object of the present invention to produce a vent having greater venting surface area for increasing venting of gas from the mold cavity.

It is another object of the invention to provide a vent capable of bi-directional flow that can be used to introduce gas, vapor, or a fluid into the mold cavity.

It is an advantage of the invention that the vent can be made as a modular vent insert that is lightweight, easy to make, simple to assemble, inexpensive to ship, easy to install, and which is rugged, durable, long-lasting, plug-resistant, and easy to clean.

It is an object of the invention to produce a vent insert that is versatile in that it can be mounted on an ejector pin or disposed in a mold cavity.

It is an object of the invention to produce a vent with orifices having a configuration that obstructs hardenable material from entering the vent and passages configured to prevent condensation in the vent.

It is an advantage of the invention to produce a pin vent that is simple to make, integrally formed from the head of the pin, reliable, rugged and plug-resistant.

It is an object of the invention to provide a system and method of controlling fluid flow to and from a mold cavity.

It is another object of the invention to provide a system and method used to introduce a foaming agent into the mold cavity through a vent.

It is another object of the invention to provide a system and method to increase the rate of heating of hardenable or moldable material.

It is another object of the invention to provide a system and method to accelerate venting.

It is an advantage of the system and method of this invention to selectively accelerate venting in one portion of a mold cavity to influence the flow of the hardenable or moldable material as it is being introduced into the mold cavity.

It is an advantage of the system and method of this invention that a foaming agent can be introduced into a mold cavity through an existing vent thereby obviating costly machining of separate foaming agent passageways into the mold.

It is an advantage of the system and method of this invention that a heating medium can be introduced through an existing vent thereby obviating costly machining of separate heat transfer medium passageways into the mold.

It is an advantage of the system and method of this invention that it is versatile, simple, inexpensive to implement, and easy to use.

It is an advantage of the system and method of the invention that it can be used to vent and introduce a fluid during the same molding cycle.

Other objects, features, and advantages of the present invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

At least one preferred exemplary embodiment of the invention is illustrated in the accompanying drawings in which like reference numerals represent like parts throughout and in which:

FIG. 8 depicts a fragmentary top view of the vent after it has been assembled;

FIG. 9 depicts an enlarged fragmentary view of the vent showing its construction and assembly in more detail;

DETAILED DESCRIPTION OF AT LEAST ONE PREFERRED EMBODIMENT

Figure 1:
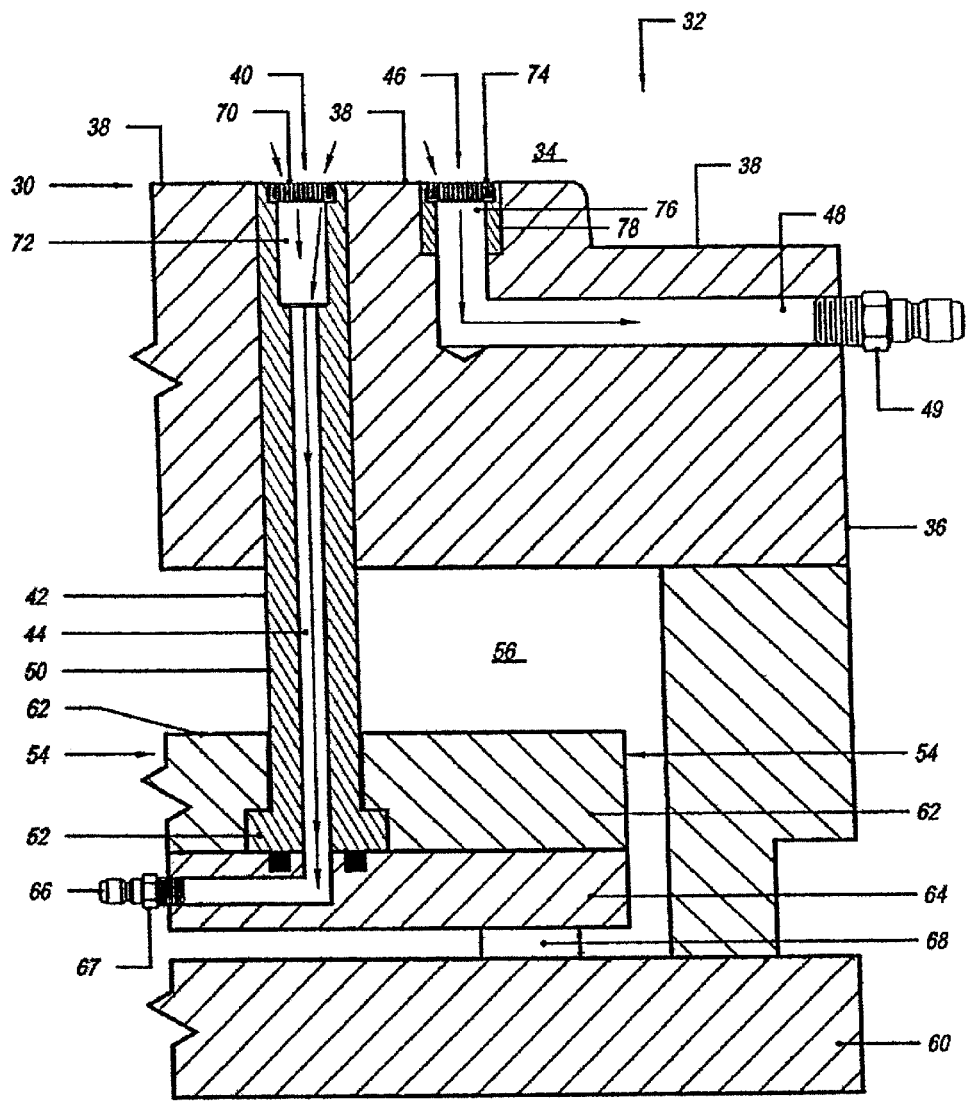
FIG. 1 illustrates a cross sectional view of a mold half depicting a pair of vent assemblies.

FIG. 1 illustrates one portion 30 of a mold 32, preferably a mold half, having a mold cavity 34 in which a hardenable or moldable material is introduced in a flowable state, preferably under pressure. The mold half 30 is comprised of an upper plate 36 with a mold cavity surface 38 that preferably is contoured to impart a desired shape to the moldable material when the moldable material solidifies or hardens.

To facilitate evacuation of air and other gases in the mold cavity, the mold half 30 has at least one vent. For example, the mold half 30 shown in FIG. 1 has a first vent 40 carried by a pin 42. Such a pin 42 can be a reciprocable ejector pin or core pin that can include a vent passageway 44. The mold half 30 is shown equipped with a second stationary vent 46 disposed in the mold cavity surface 38 that communicates with a vent passageway 48 in plate 36.

During molding, another portion of the mold 32 mates with the mold half 30 and a hardenable material is introduced into the mold cavity 34. During venting, atmosphere from in the mold cavity 34 is vented from the cavity 34 out each vent 40 and 46 as the hardenable material fills the cavity 34. A connector, such as a nipple 49 and 67, can be used to attach a line 66 (FIG. 1) to passageway 44 or 48.

The pin 42 has an elongate barrel 50 that preferably is generally cylindrical. Vent 40 is received in one axial end of the pin 42 and the pin 42 has an enlarged mounting head 52 at its opposite end. The mounting head 52 is captured by an ejector assembly 54 disposed inside a hollow 56 in the mold. The hollow 56 is defined by at least one riser 58 that spaces the mold half plate 36 from a mold base 60. The ejector assembly 54 includes an upper ejector plate 62 mounted to a lower ejector plate 64 (backup plate) to capture the mounting head 52 of the pin 42 therebetween. The lower ejector plate has a passageway that communicates with passageway 44, preferably to deliver air and gas vented from the mold cavity 34 to the exterior of the mold 32. The lower ejector plate 64 is shown in FIG. 1 resting on a spacer 68 that can be a piston of a cylinder that reciprocates the ejector assembly 54 and pin 42 during ejection of a mold part from the mold cavity 34.

The first vent 40 includes a perforate vent grate 70 disposed in a pocket 72 in the pin 42. The second vent 46 includes a grate 74 disposed in a pocket 76 in a sleeve 78 in the mold cavity surface 38 but can be received in a pocket in the mold half plate 36. The sleeve 78 preferably is fixed in the mold 32 but can be removed, such as for changing the vent grate 74 or for cleaning the vent 46. Since vent 40 and 46 are of the same construction, only vent 40 will be described herein in more detail.

Figure 2:
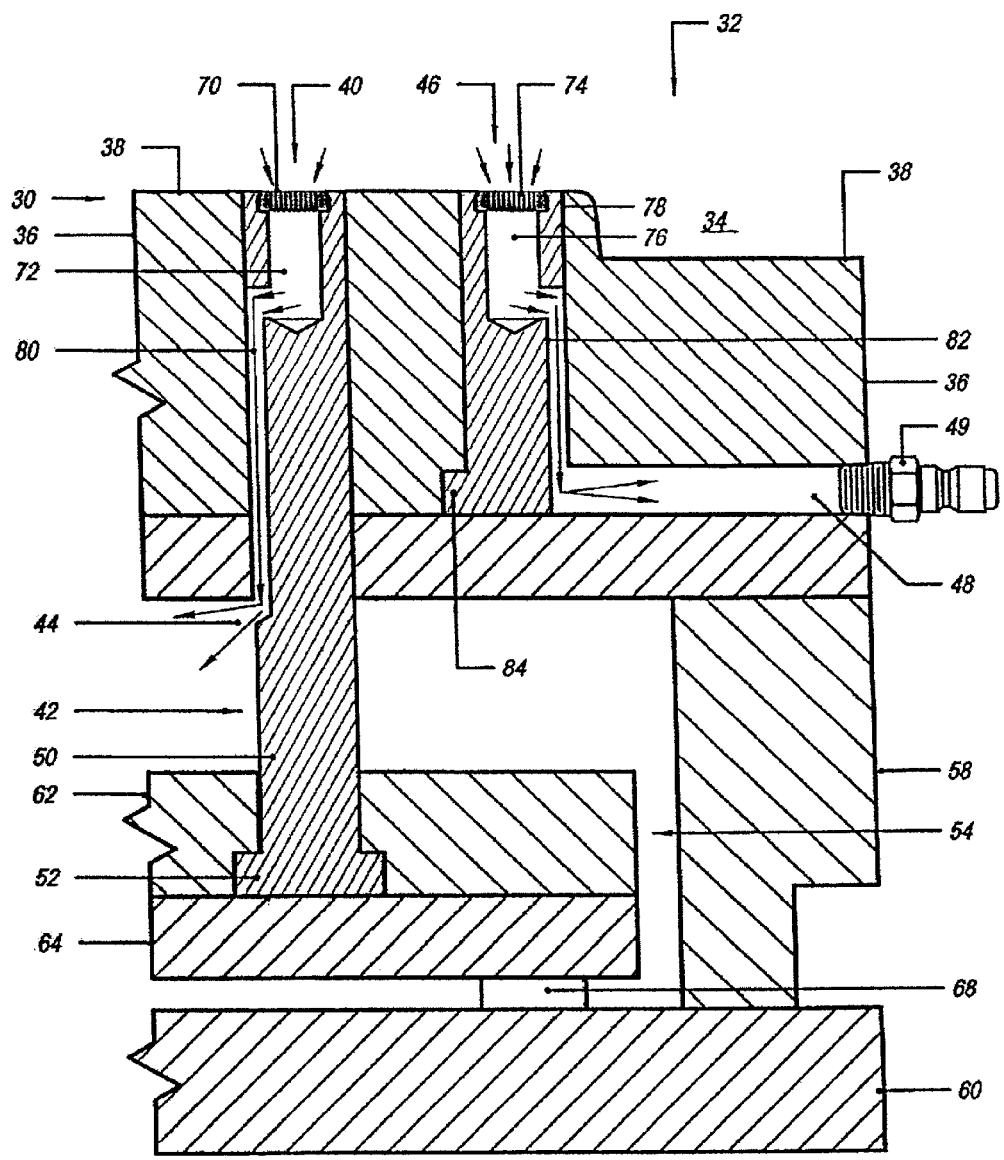
FIG. 2 illustrates a cross sectional of another mold half depicting a second pair of vent assemblies.

FIG. 2 illustrates a second exemplary mold and vent arrangement. The vent passageway 44' of the pin 42 is defined at least in part by a flat 80 that permits vented air and any other gases in the cavity to flow between the flat and the bore in the mold half plate 36 in which the pin 42 is received. By this arrangement, no passageway need be formed in ejector plate 64 thereby advantageously enabling an unmodified plate to be used.

Vent passageway 48 is defined in part by a flat 82 in modified sleeve 78'. The sleeve 78' has a projection 84 received in a recess in mold half plate 36 to prevent its removal. The recess can be constructed to permit the sleeve 78' to be removed by rotation to remove the projection 84 from the recess so the sleeve 78' can be pulled from the pocket in the plate 36. Preferably, the plate 36 is attached to another plate 86 such that the projection 84 of the sleeve 78' is releasably captured between the plates 36 and 86.

Figure 3:
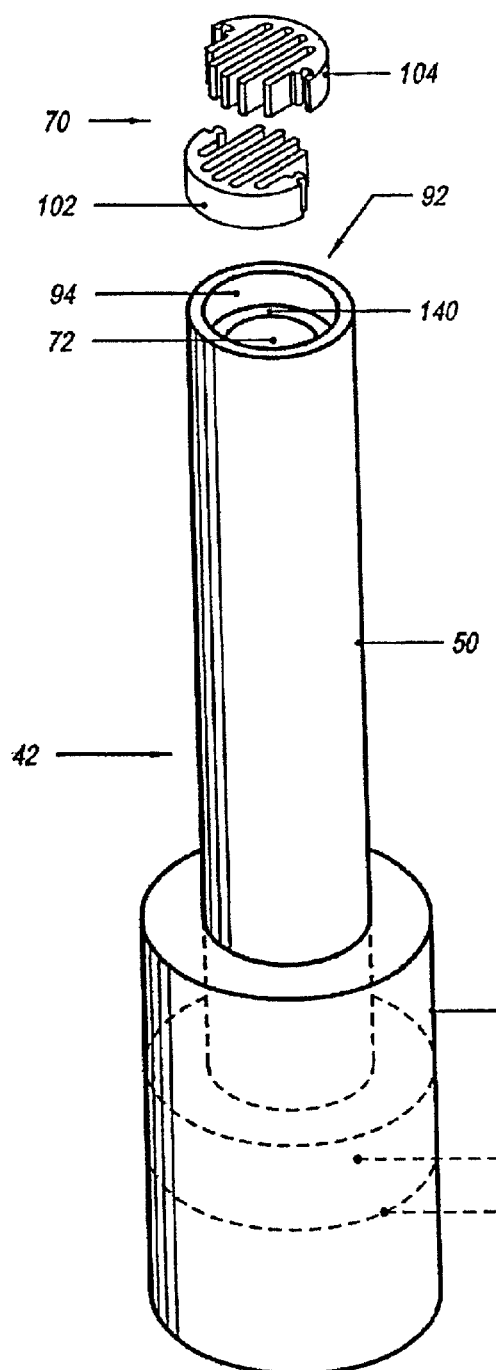
FIG. 3 illustrates one embodiment of a pin vent.
Figure 4:
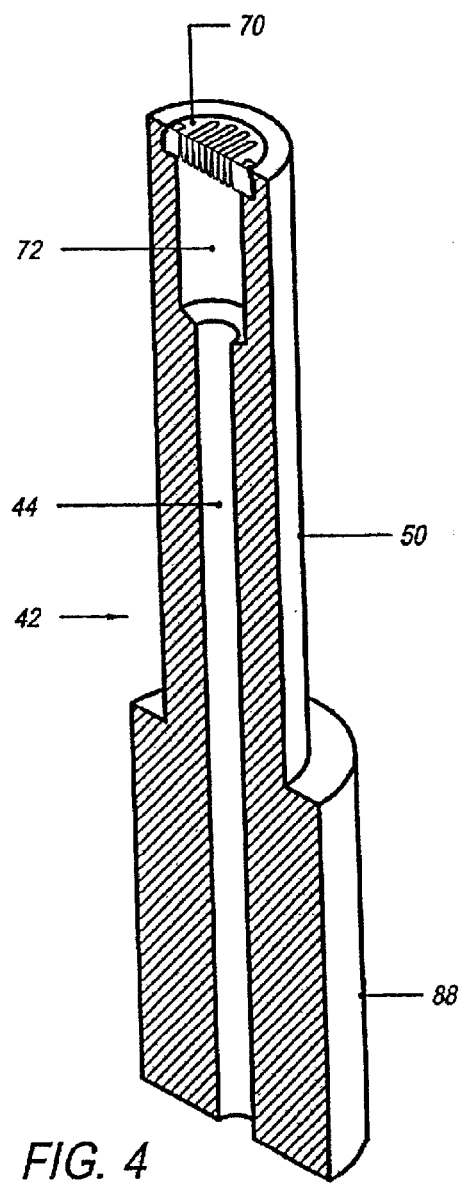
FIG. 4 illustrates a cross sectional view of the pin vent.

FIGS. 3 and 4 illustrate an exemplary pin and vent arrangement. The barrel 50 of the pin 42 is machined from round stock leaving an enlarged portion 88 at one end that is cut to the desired length 90 and machined to form the mounting head 52, such as along the phantom lines shown in FIG. 3. Before at least the barrel 50 is hardened, the vent passageway 44 is formed, such as by gun drilling, laser drilling, electron-beam boring, or the like. In a preferred method of making the pin 42, the barrel 50 is machined from stock, the passageway 44 and pocket 72 formed, the barrel 50 hardened without hardening the enlarged portion 88, and thereafter the mounting head 52 is cut from the enlarged portion 88.

The vent passageway 44 is shown in more detail in FIG. 4. The passageway 44 extends substantially the length of the pin 42 and communicates with the pocket 72. In one preferred construction, the passageway extends from one end of the pin 42 to the opposite end of the pin 42. The pocket 72 is shown having a larger width or diameter than the passageway 44. As is shown in FIG. 3, the mouth 92 of the pocket 72 can have an expanded portion 94, such as a counterbore, having a width or diameter sufficient to receive the vent grate 74. The vent grate 74 can be press fit, welded, or otherwise fixed in the mouth 92 of the pocket 72.

Figures 5, 6:
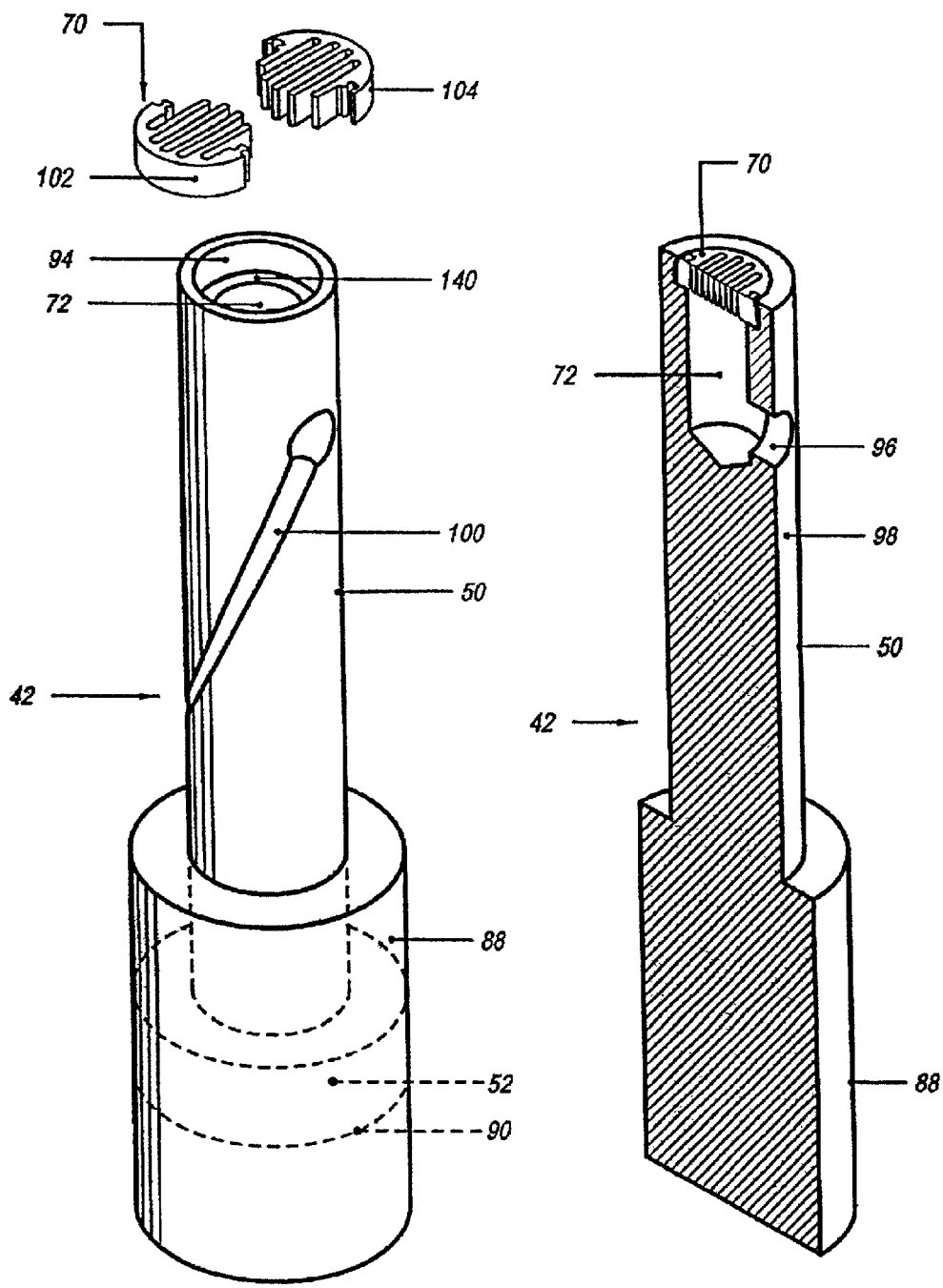
FIG. 5 illustrates a perspective view of second embodiment of a pin vent.
FIG. 6 illustrates a cross sectional view of the second pin vent embodiment.
Figure 7:
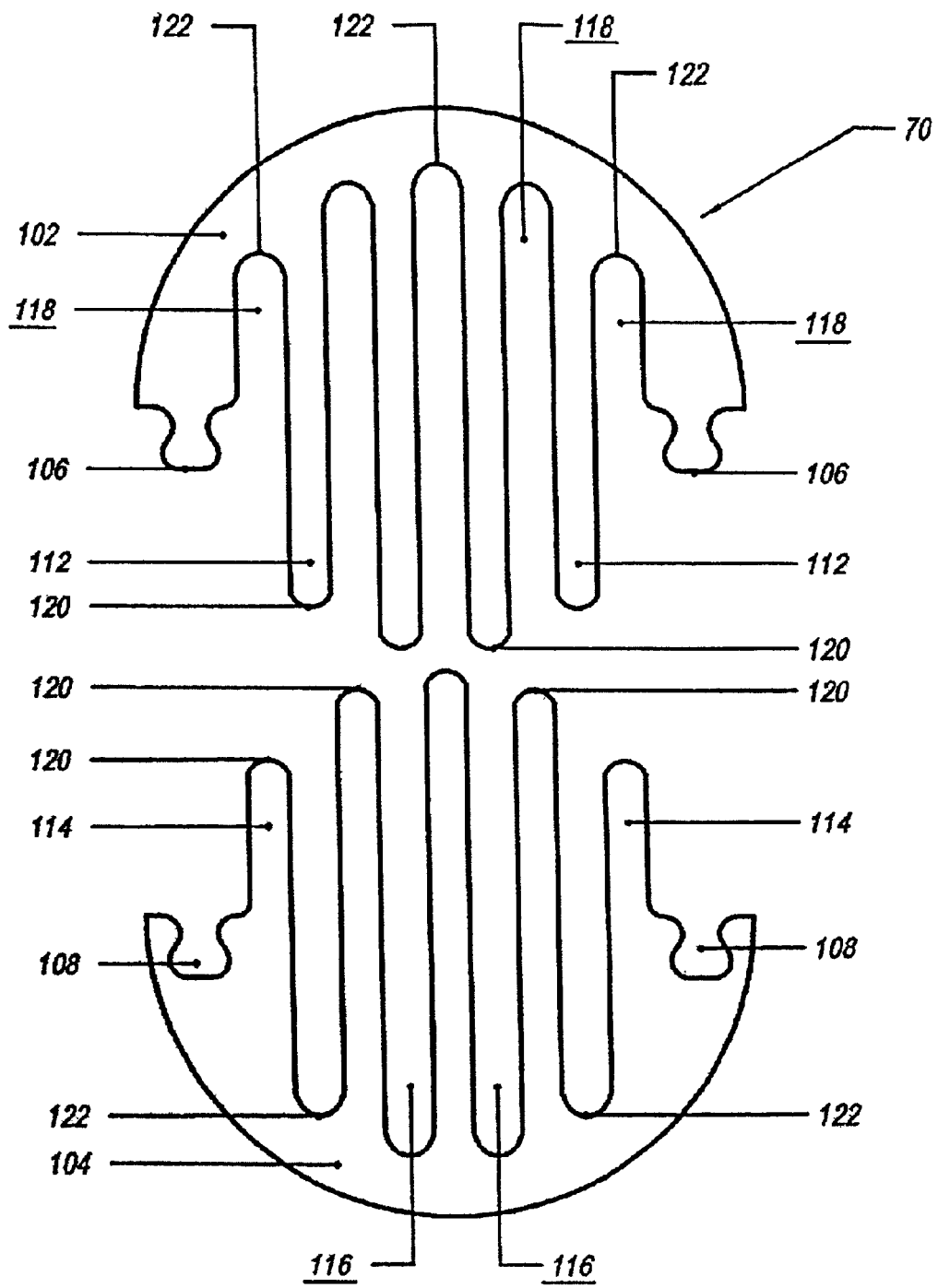
FIG. 7 illustrates a top exploded view of one preferred vent embodiment.
Figure 14:
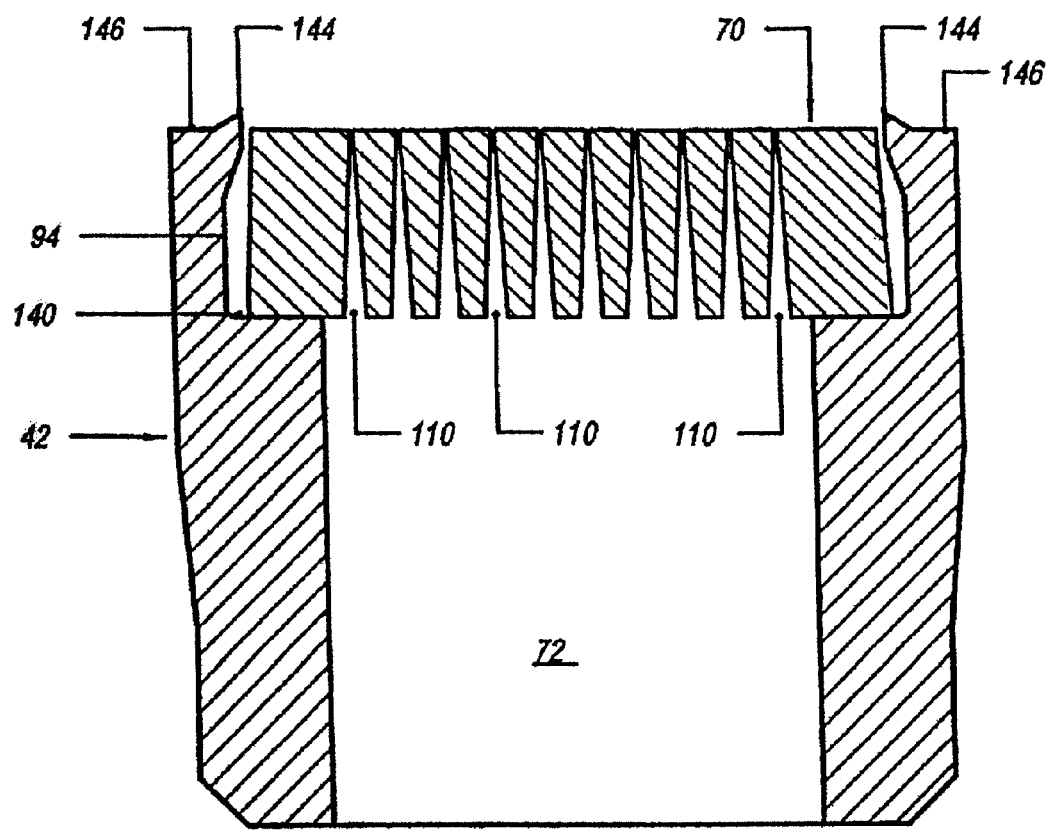
FIGS. 14 and 15 are sectional views of the vent and pin before assembly.

Another preferred pin and vent arrangement is shown in FIGS. 5 and 6. The vent passageway has a port 96 that extends generally radially outwardly from the pocket 72 to an outer radial surface 98 of the pin barrel 50. The pin shown in FIG. 5 has a channel or groove 100 in the outer surface 98 that extends axially at least a portion of the length of the barrel 50. In the exemplary embodiment of the channel 100 shown in FIG. 5, the channel 100 spirals around the barrel and extends axially at least half the axial length of the barrel 50.

FIGS. 3–11 depict a preferred embodiment of the vent grate 70 or 74. The grate has at least two parts 102 and 104 that interlock during assembly. Preferably, all parts of the grate interlock with at least one other part of the grate to ultimately form a grate of integral construction before the grate is assembled to a pin or a mold.

One of the grate parts 102 has a key 106 that is received in a keyway 108 in another of the parts 104 defining at least one vent orifice 110 or vent passage 110 between the parts through which air and gas passes during venting of the mold cavity 34. In assembly of the parts 102 and 104, the key 106 of one of the parts is received in a keyway 108 in another of the parts slidably interlocking the parts 102 and 104 together. Where the grate is comprised of only two such parts 102 and 104, the parts slidably interlock to form the grate, such as is shown in FIGS. 4, 6, 9, 10, and 11. So that the parts slide together during assembly and fit well, the parts are constructed to have between about a 0.0002 inch to about a 0.0004 inch assembly clearance. This tolerance also ensures that the size of each slot 132 has the proper tolerance such that it is large enough to allow gas and vapor to pass through while small enough to prevent hardenable material from passing through.

Each grate part 102 and 104 has at least one finger that extends outwardly and is received in a recess or pocket of another part. Preferably, the one part 102 has a plurality of spaced apart fingers 112 that are each received in a recess 116 between a pair of fingers 114 of the other part 104. The pair of fingers 114 of the other part 104 is each received in a recess 118 in the one part 102. In a preferred vent grate embodiment, each part 102 and 104 has a plurality of pairs of the fingers that interleave when both parts 102 and 104 are assembled to each other, such as in the manner shown in FIG. 9.

Figure 10:
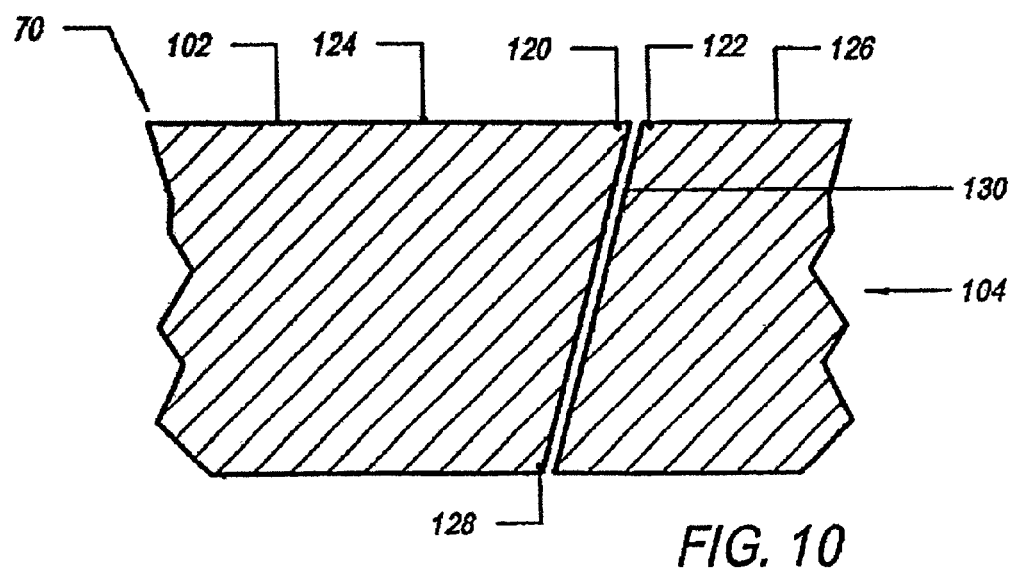
FIG. 10 is an enlarged fragmentary sectional view of a portion of the vent.

To help strengthen the vent grate 70 to help it withstand the repeated impact of the hardenable material when it is injected into the mold cavity, the end 120 of each finger preferably bears against an innermost portion 122 of the edge of the recess in which it is received. Referring to FIG. 10, to help minimize deflection of each finger during molding when the molding material impacts against the outer surface 124 and 126 of the grate, the edge 128 of the finger and the edge 130 of the innermost portion is inclined or canted so that deflection of the finger is limited by the support provided by the edge 130 it contacts.

Referring particularly to FIG. 9, each vent passage 110 has a minimum width narrow enough to prevent the hardenable or moldable material from entering the slot while being wide enough to allow air and other gases to pass through, preferably without condensing in the passage 110. In a preferred embodiment where the molding material is plastic, the passage 110 has an oblong mouth 132 that preferably is shaped like a slot. The width, w, of the slot 132 is between about 0.005 inches and about 0.0005 inches. This slot width, w, range is critical for keeping molten plastic from entering and plugging one or more passages 110. The slot width, w, can be larger or smaller where the molding material is not plastic.

Figure 11:
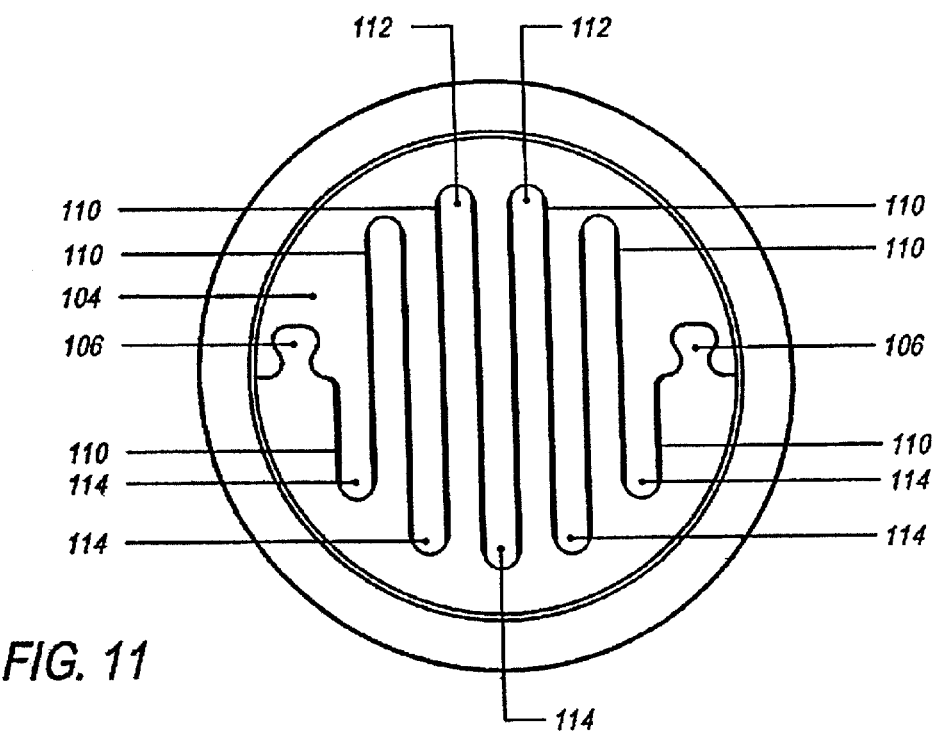
FIG. 11 is a top view of a vent and pin.
Figure 12:
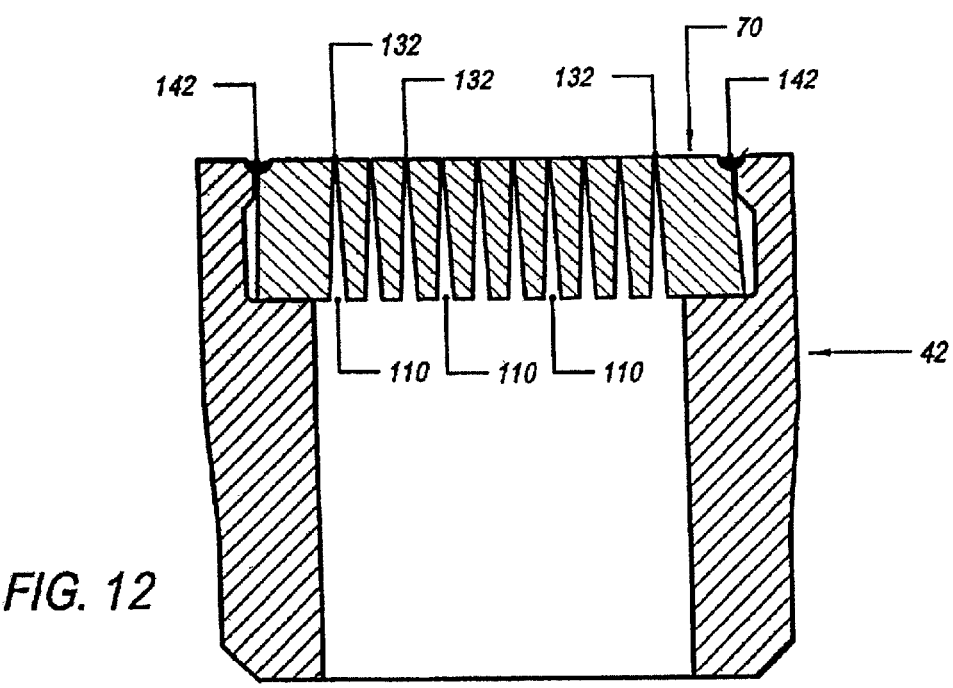
FIG. 12 is a cross sectional view of the vent adhesively secured to the pin.

Referring to FIGS. 11 and 12, the vent grate 70 has ten vent passages 110 with the slots 132 of some passages 110 being longer than the slots 132 of other passages 110. With the exception of the outermost slots 132 adjacent the keys 106 and keyways 108, each slot 132 has a length of at least about 0.030 inches. The outermost slots preferably have a length of at least about 0.125 inches. Although the grate 70 can be configured with as little as two, four or six slots 132, each grate preferably has ten or more slots 132. As a result of having this many slots 132, the grate 70 can advantageously withstand some plugging while still remaining functional.

The use of a larger number of slots 132 advantageously increases venting area defined as the total slot area of the grate. For example, a vent grate of this invention that is 0.187 inches in diameter (and larger) has at least 0.0015 square inches venting area, a vent grate that is 0.250 inches in diameter (and larger) has at least 0.002 square inches of venting area, a vent grate that is 0.312 inches in diameter (and larger) has at least 0.004 square inches of venting area, a vent grate that is 0.375 inches in diameter (and larger) has at least 0.006 square inches of venting area, and a vent grate that is 0.5 inches in diameter (and larger) has at least 0.010 square inches of venting area.

Figure 13:
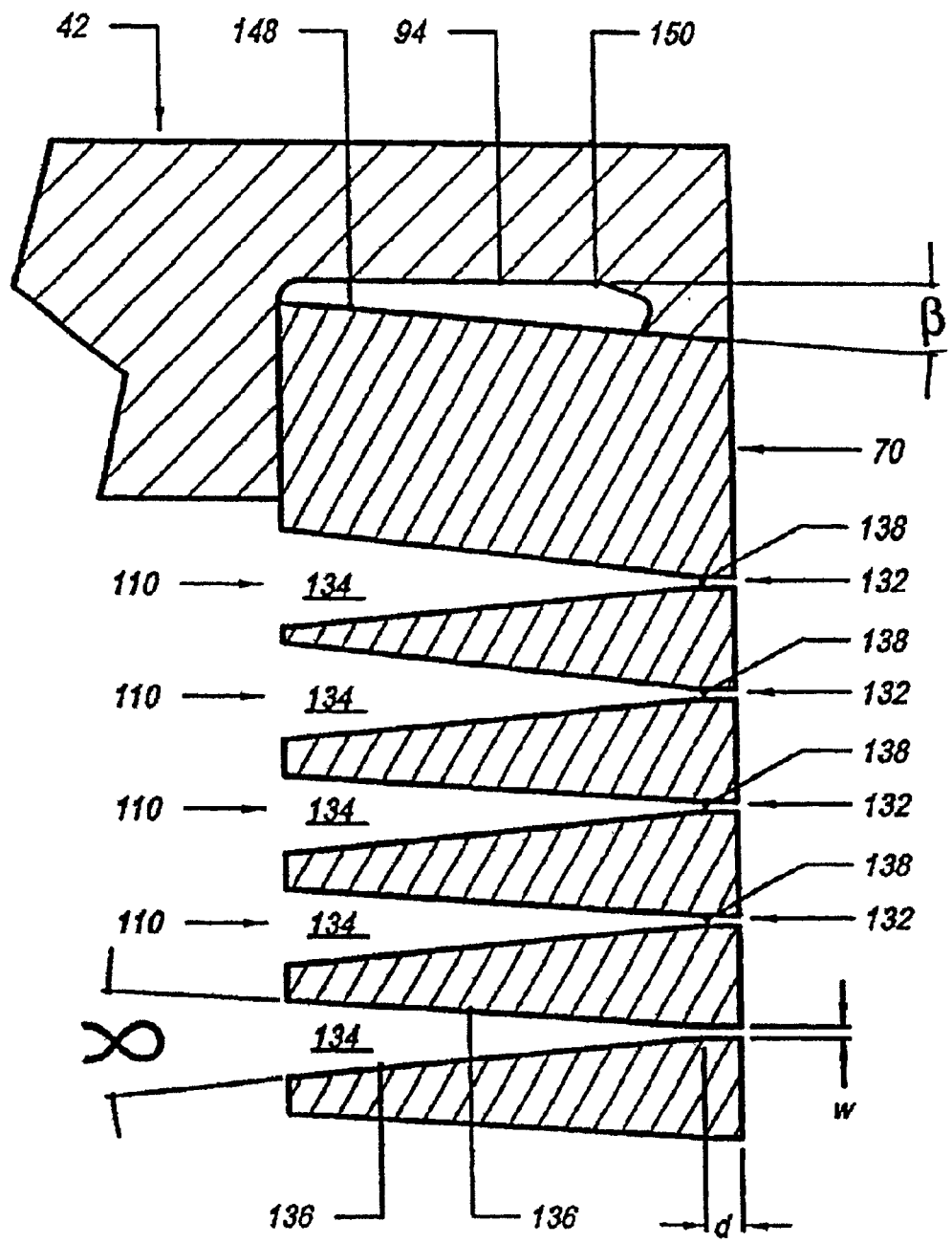
FIG. 13 is an enlarged fragmentary sectional view of the vent and pin.

Referring to FIGS. 12–13, each vent passage 110 tapers outwardly from adjacent its mouth 132 toward its discharge chamber 134 into the vent passage. Because of this taper, each passage 110 widens decreasing the pressure of fluid as it travels downstream of the mouth 132. By decreasing the gas pressure in this manner, condensation of vapor (volatile gas or the like) in a passage 110 is prevented. To further discourage condensation and plugging of the vent, each sidewall 136 of each passage 110 preferably is substantially smooth and non-porous. To produce a sufficiently smooth sidewall 136, each sidewall 136 is produced by machining, preferably wire EDM machining.

In a preferred passage embodiment, the slot 132 has a throat depth, d, that is about three to about five times the slot width, w. In the throat or entryway region 138 (lies just downstream of the slot 132), the width is about equal to w and can help obstruct the passage of hardenable material. Adjacent opposed sidewalls 136 define a passage 110 and taper outwardly away from each other, preferably downstream of the throat 138. Preferably, adjacent opposed sidewalls 136 taper away from each other such that an angle, α, between the adjacent opposed sidewalls 136 of between about 3° and about 9° is formed. Such a preferred angular range is not trivial as it expands the volume which gas in a passage 110 can occupy rather quickly after entering the narrower slot 132 and passing through any throat region 138 thereby quickly reducing the pressure of the gas and advantageously preventing its condensation.

In assembly, the keys 106 of one half 102 of the vent grate 70 are each received in a respective keyway 108 in the other vent grate half 104. The assembled vent grate 70 is placed in the expanded portion 94 of the pocket 72 such that it rests on surface 140 (FIG. 5). Surface 140 serves as a shelf that has a width or diameter smaller than that of the grate 70 such that the grate 70 rests on the shelf 140 and the shelf 140 supports the grate 70.

Referring once again to FIG. 12, to secure the grate 70 to that which it is mounted, the grate 70 can be attached by a weld 142 using a high energy density beam welding process that welds the grate 70 about the periphery of the grate 70. Examples of preferred high energy density beam welding processes suitable for welding the grate include laser welding, and electron beam welding. Where the grate 70 is mounted to a pin, such as pin 42, the grate 70 is welded to the pin. Where the grate 70 is received in an insert, such as the sleeve 78 shown in FIG. 1, the grate 70 can be welded to the insert. Where no insert is used, the pocket 72 can be formed in a mold half and the grate 70 can be welded directly to the mold half.

Figure 15:
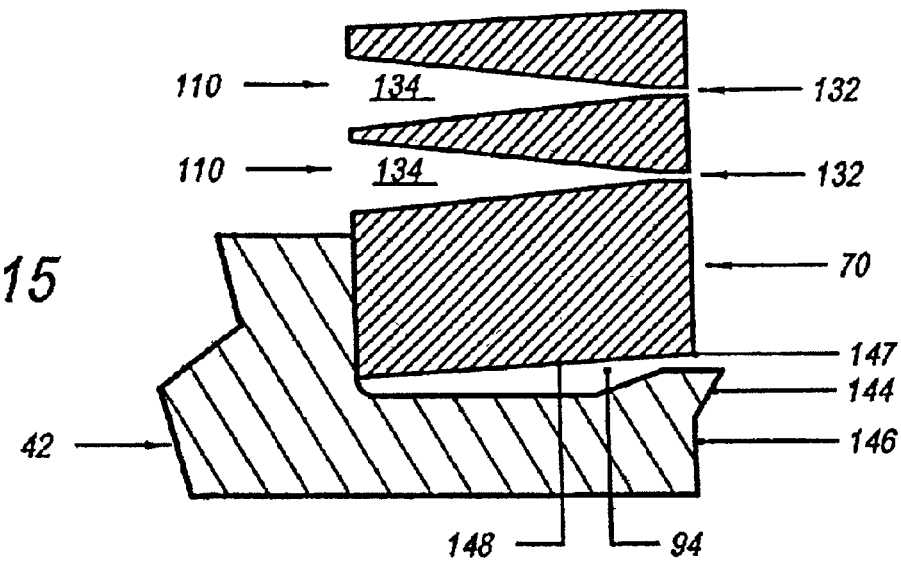
Figure 16:
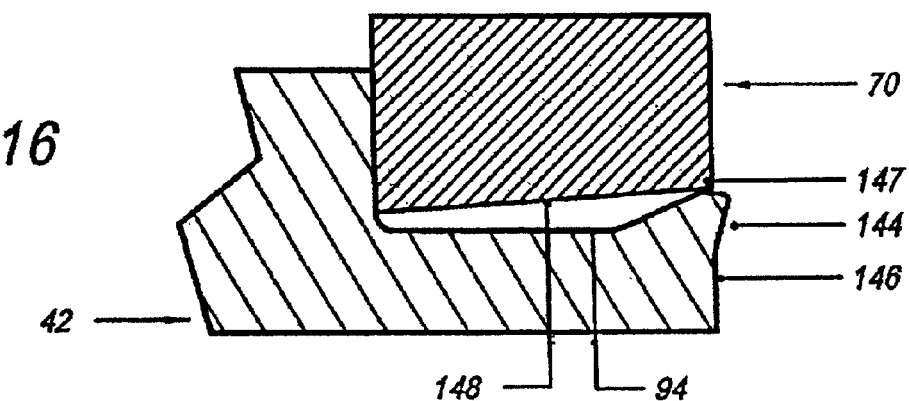
FIG. 16 is a fragmentary sectional view of the pin and vent as the pin is being deformed around the vent during assembly.
Figure 17:
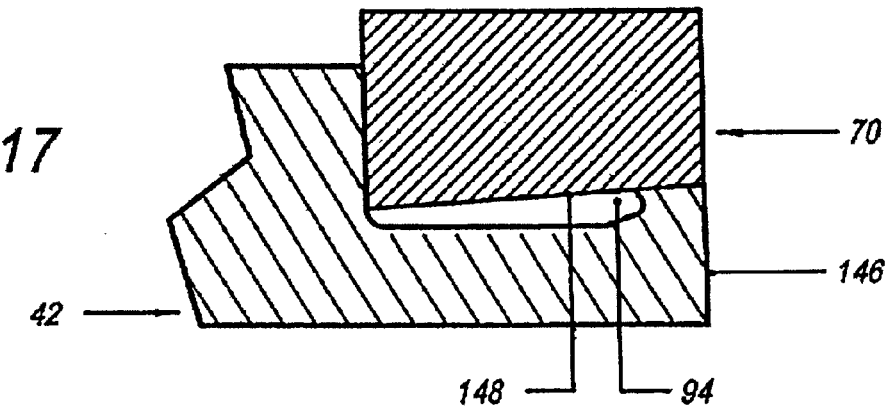
FIG. 17 is a fragmentary sectional view of the pin and vent after the pin has been deformed around the vent.

Another preferred method of securing the vent grate 70 is depicted in FIGS. 14–17. To capture the grate 70 after it has been is been placed in recess 94, the inner edge has a lip 144 adjacent the outer axial surface 146 of the pin, insert or mold. In a preferred embodiment, the lip 144 extends about the entire periphery of the inner edge. Initially, as is shown in FIG. 15, the lip 144 extends outwardly from the rest of the outer surface 146. Referring to FIG. 16, a rolling or swaging operation is performed to deform the lip 144 to urge the lip 144 toward the outer edge 146 of the grate 70. The rolling or swaging operation preferably is performed by applying a tool (not shown) against the lip 144 preferably by rolling or swaging the tool about the periphery of the edge. Rolling or swaging is performed until the lip 144 is sufficiently deformed such that it bears against the outer edge 147 and outer sidewall 148 of the grate 70. When finished, the outer surface 146 surrounding the grate 70 preferably is flush or substantially flush with the outer surface 152 of the grate 70. If desired, the outer surface 152 of the grate 70 can be slightly recessed relative to outer surface 146.

To help prevent withdrawal of the grate 70 from the recess 94, the sidewall 148 of the grate 70 is outwardly inclined or canted such that the width or diameter of the grate 70 adjacent the mold cavity is less than the width or diameter of the grate adjacent the pocket 72. In a preferred embodiment shown in FIG. 13, the grate sidewall 148 is outwardly angled relative to the inner sidewall 150 of the recess 94 at an angle, β, of between about 2° and about 6°. By this outwardly inclined grate sidewall 148 construction, the grate 70 is captured in the recess 94 and will withstand the tremendous pressure and cycling that typically takes place during mold operation without coming loose.

Figure 18:
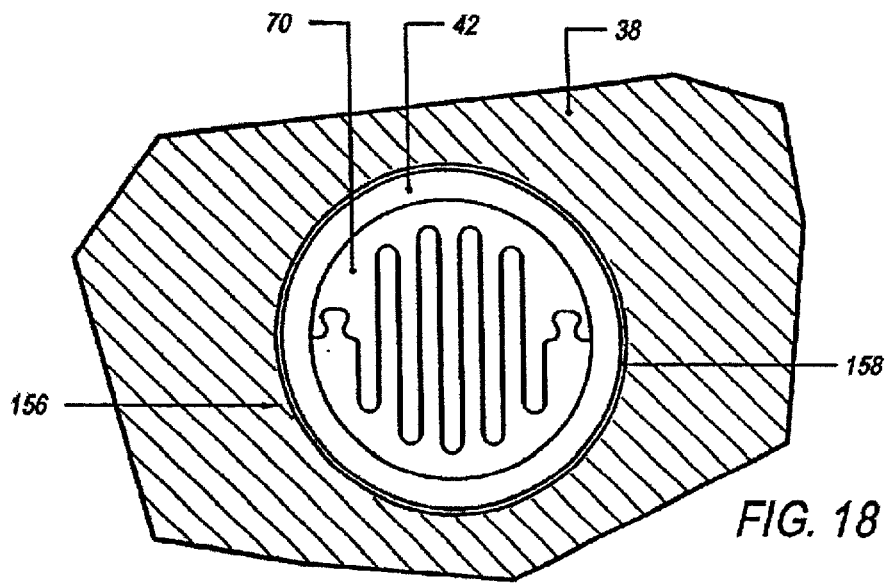
FIG. 18 illustrates a vent and pin disposed in a mold.
Figure 19:
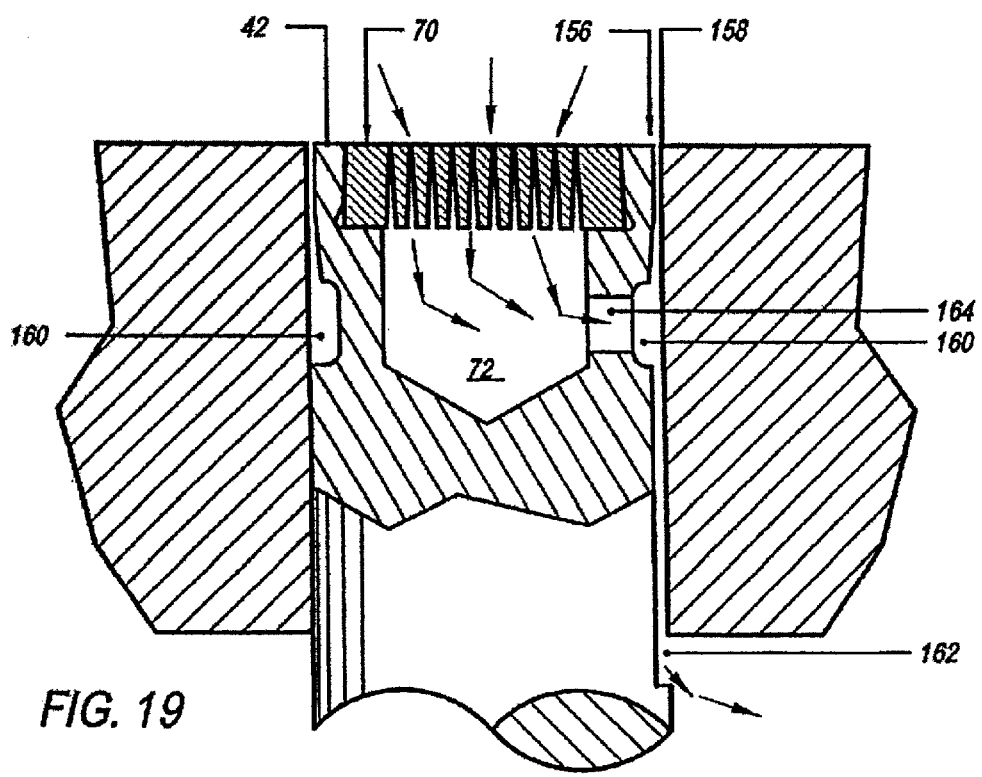
FIG. 19 depicts a cross sectional view of the vent and pin shown in FIG. 18.

FIGS. 18 and 19, illustrates a vent 70 of this invention in combination with a perimeter pin vent 156. The end of the pin 42 has a clearance 158 of between about 0.005 inches and about 0.00005 inches between the outer periphery of the pin 42 and the periphery of the mold cavity 34 encircling the pin 42 to permit atmosphere to be vented from the mold cavity while preventing hardenable material from entering the vent 156. The clearance or vent space 158 communicates with a radial channel 160 in the pin barrel 50 that leads to an axially extending flat 162. The flat 162 preferably permits the gas being vented to escape to an atmosphere exterior of the mold.

Gas vented through the passages 110 in the vent grate 70 travels through the pocket 72 out a radially extending port 164 that communicates the vented gas to the flat 162. In one preferred embodiment, the port 164 communicates the vented gas to channel 160 that, in turn, communicates the vented gas to the flat 162.

Figure 26:
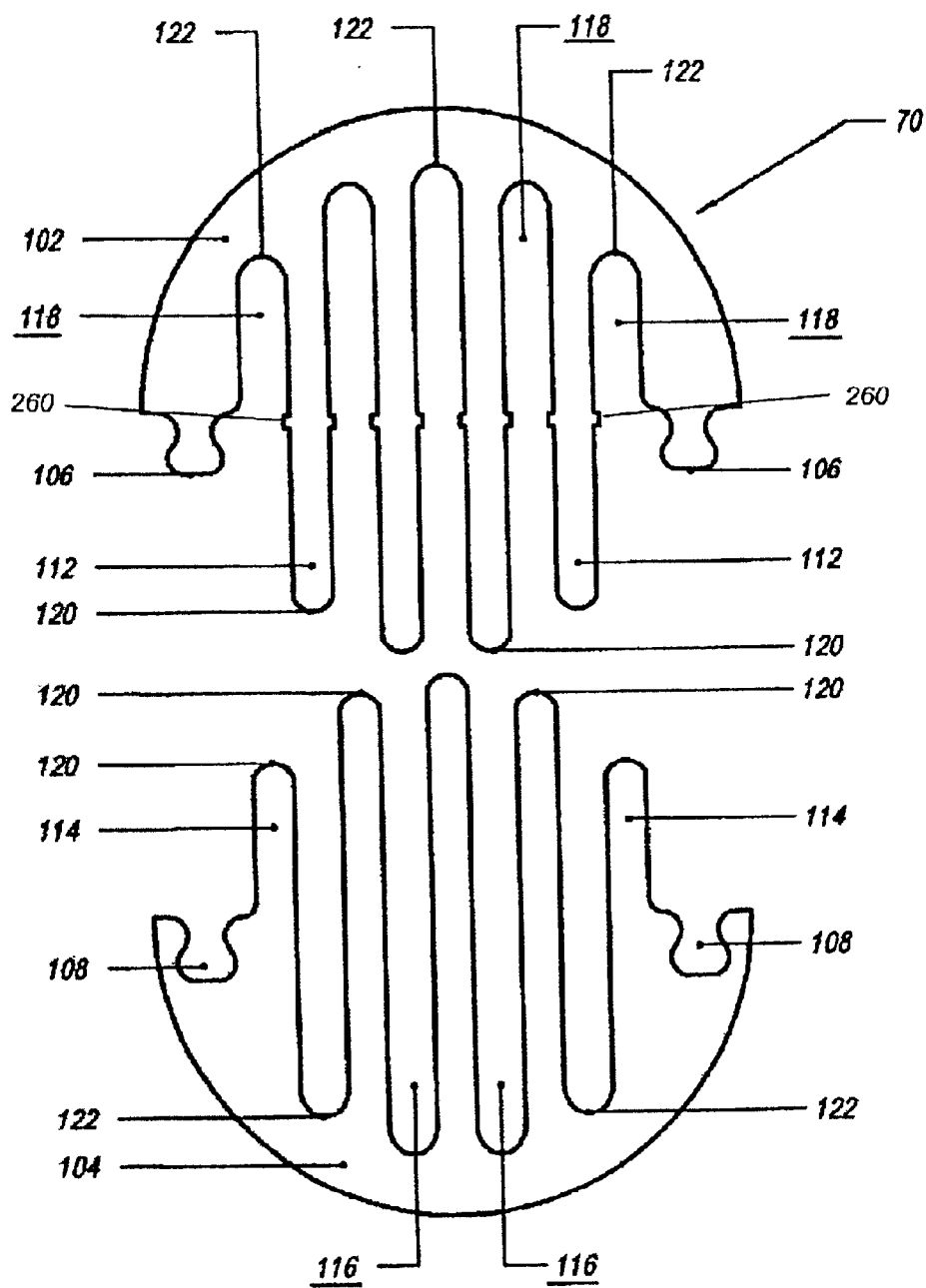
FIG. 26 illustrates a top exploded view of another preferred vent embodiment.
Figure 27:
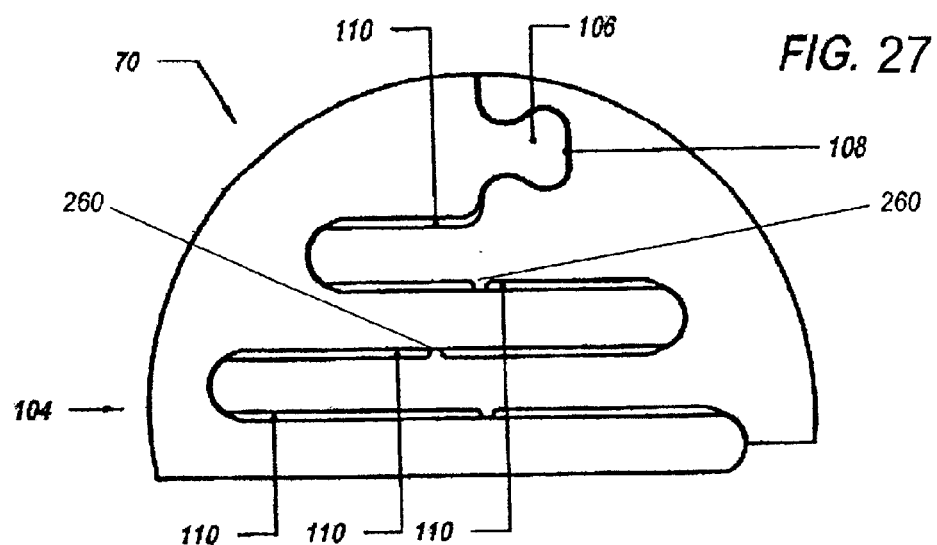
FIG. 27 depicts a fragmentary top view of the vent shown in FIG. 26 after it has been assembled.
Figure 28:
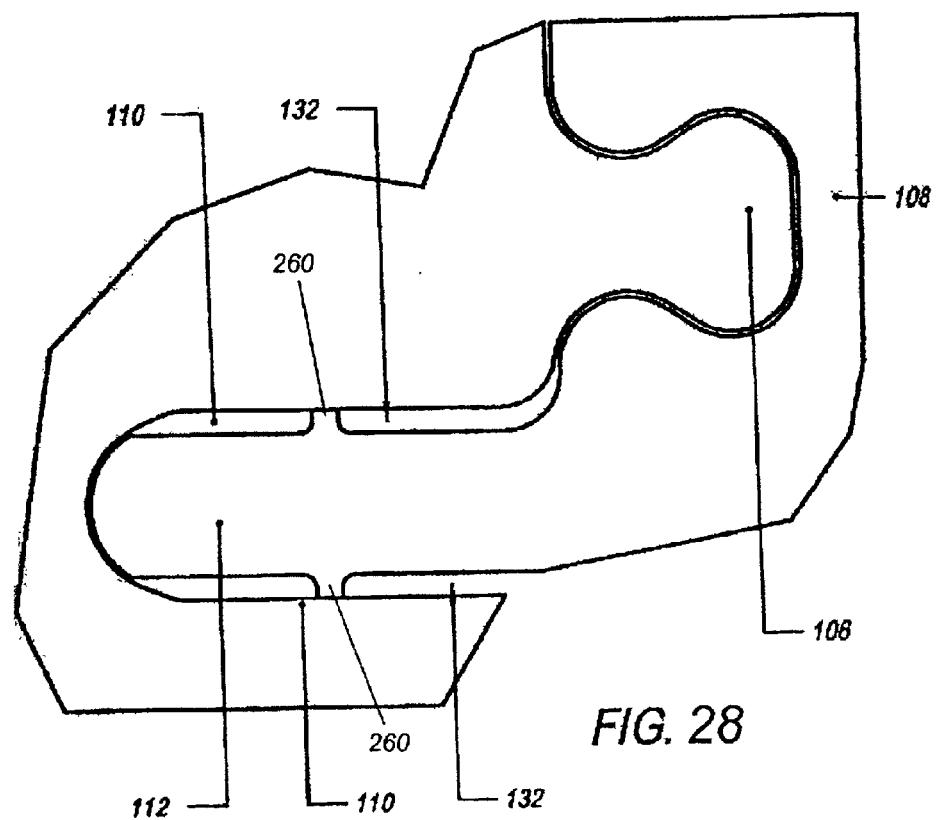
FIG. 28 depicts an enlarged fragmentary view of the vent showing its construction and assembly in more detail.

FIGS. 26–28 illustrate another preferred vent grate embodiment. The vent grate is like that depicted in FIGS. 7–9, but has a spacer 260 disposed in each vent slot 110. Each spacer 260 bisects a slot 110 and helps support the fingers 112, 114 that define the slot during venting. In one preferred embodiment, each spacer 260 is disposed in the mouth or opening of a slot 110 that is exposed toward the mold cavity. In another preferred embodiment, each spacer 260 is disposed in the mouth and extends a distance axially into the slot 100. If desired, the end of the spacer 260 can be axially recessed or offset from the mouth.

In the preferred embodiment shown in FIGS. 26–28, each spacer 260 is an outwardly extending tab that is formed in an outer surface of one of the fingers, such as finger 112. In a preferred tab configuration, the tab 260 has squared edges. Each finger 112 is shown equipped with a pair of outwardly extending tabs 260. If desired, a finger 112 can be equipped with a single tab 260, such as is depicted in FIG. 27.

In a preferred implementation, each tab 260 extends outwardly from a finger 112 a sufficient distance so as to be in close proximity to or in contact with an adjacent finger 114 when the grate portions 102, 104 are assembled. While FIG. 26 depicts the tabs 260 extending outwardly from the fingers 112 of one grate portion 102, all of the tabs 260 can extend outwardly from the fingers 110 of the other grate portion 104. If desired, some of the tabs 260 can be carried by the fingers 112 of one grate portion 102 and some of the tabs 260 can be carried by the fingers 114 of the other grate portion 104.

In one preferred embodiment, the tabs 260 are aligned, such as in the manner depicted in FIG. 26. If desired, the tabs 260 can be staggered, such as in the manner depicted in FIG. 27. Preferably, a plurality of the tabs 260 are each spaced a distance from the end of a slot 110 such that they are located at least one third to one half the length of the slot 110 from the slot end to help minimize finger deflection. Preferably, there is a tab 260 in each slot 110 such that pressure that builds up during venting that tends to urge fingers 112, 114 apart is transferred by the tabs 260 to the outer body 102 and/or 104 of the grate. As a result, the tabs 260 support the fingers 112, 114 during venting to prevent them from being bent. Additionally, the tabs 260 also oppose finger deflection during venting, which, in turn, prevents slot widening. Prevention of slot widening is desired during venting as it prevents moldable material from the mold cavity becoming lodged in a slot 110, possibly plugging it.

In a method of making the vent grate 70, each grate half 102 and 104 is formed from a blank initially made from another blank of material that preferably is a nonporous material to lessen the likelihood of condensation occurring during venting. Each vent grate half 102 and 104 is made of a durable, resilient and tough material. Each vent grate is made of a material that is corrosion-resistant and which will preferably not corrode (noncorrosive) so that the vent holes will not become plugged by corrosion. Preferably, each vent grate half 102 and 104 is made of a metal that preferably is a stainless steel. A preferred material is 455 stainless steel or a maraging stainless steel for minimizing distortion of the grate halves when they are made, if they are made by a machining process.

Figure 20:
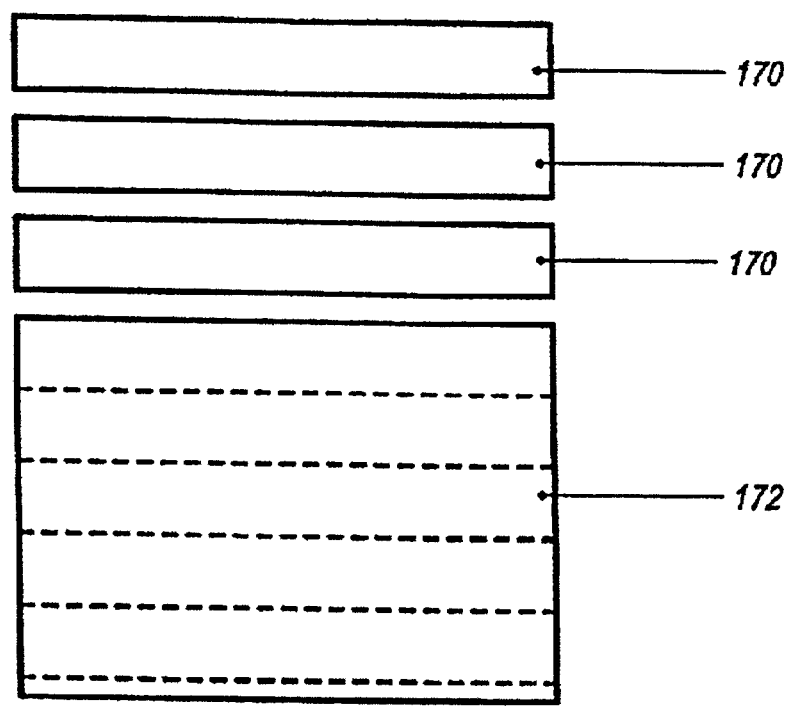
FIG. 20 depicts a series of blanks from which a vent of this invention or a portion thereof is ultimately formed.

Referring to FIG. 20, disc-shaped or wafer-shaped blanks 170 are cut from stock 172 that can be, for example, square, rectangular, or round stock. Preferably, blanks 170 are cut from round stock using a laser or a water jet. If desired, blanks 170 can be cut using a discharge machining process such as Electrical Discharge Machining (EDM), Electrical Chemical Machining (ECM), a laser, or the like. After cutting, at least one cut surface of each blanks 170 can be further machined, such as by grinding, so that its thickness is brought within a tolerance of about ±0.0002 inches of a desired thickness.

Where it is desirable to selectively improve certain characteristics of the blank 170, each blank 170 can be heat-treated. If heat treatment is performed, it preferably is performed after cutting and grinding. Preferably, heat treatment is performed before forming the pockets and fingers of each vent grate. So that each finished grate has a desirable hardness, the blank 170 is formed so as to have a surface hardness of at least about 35 Rockwell C.

Figure 21:
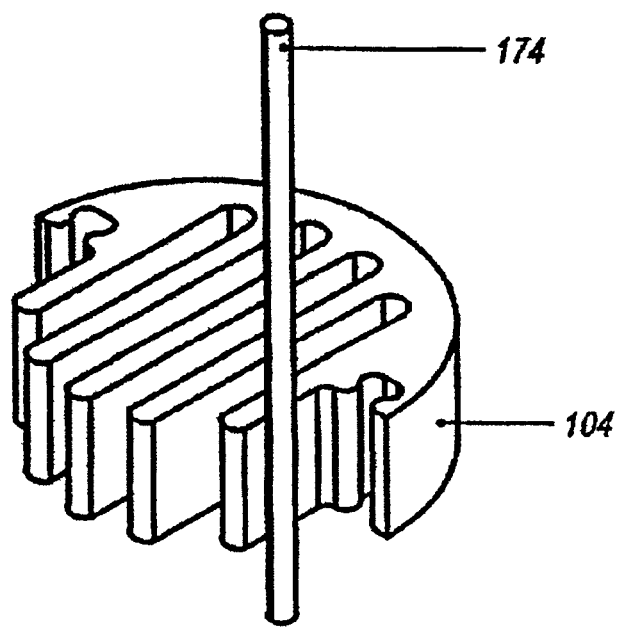
FIG. 21 illustrates forming part of the vent from one of the blanks.

After the disc or wafer blanks 170 are cut, each one is machined to cut it into two pieces, essentially forming vent grate halves 102 and 104. During machining, each of the fingers, pockets, keys and keyways in each vent grate half 102 and 104 are formed along with the necessary clearances in the fingers to form the vent slots 132 and vent passages 110 when the two vent grate halves are assembled. In a preferred method of making the vent grate halves 102 and 104, each vent grate half preferably is machined using a high precision machining such as an electrical discharge machining process or a micromachining process. The choice of these machining processes is important because it enables the components of the present invention to be made with tolerances precise enough to permit gas to flow through the vent while obstructing flow of hardenable material. Preferably, as is depicted in FIG. 21, each vent grate half 102 and 104 is machined using a wire 174 of a wire EDM machining process. Examples of other suitable machining processes include using a laser, water jet machining, a high-precision grinding process, or another suitable high-precision machining process.

In assembly, each key 106 of one of the grate halves 102 is positioned such that it overlies a keyway 108 in the other one of the grate halves 104 and the two halves are brought toward each other until each key 106 is received in one of the keyways 108. When the two halves 102 and 104 have been assembled such that at least one of their axial surfaces is flush, the assembled grate is assembled to a pin or to a mold. If desired, the grate can be welded about at least part of its periphery to the material surrounding the pocket to secure the grate. If desired the grate and the material surrounding the grate can be deformed to capture the grate in the pocket.

In operation, atmosphere in the mold cavity is vented through the vent grate 70 as a hardenable material is injected into the cavity. The hardenable material does not pass through the slots 132 of the grate 70. If desired, gas, air, vapor, or a different fluid can be directed in the opposite direction through the vent grate 70 into the mold cavity.

Figure 22:
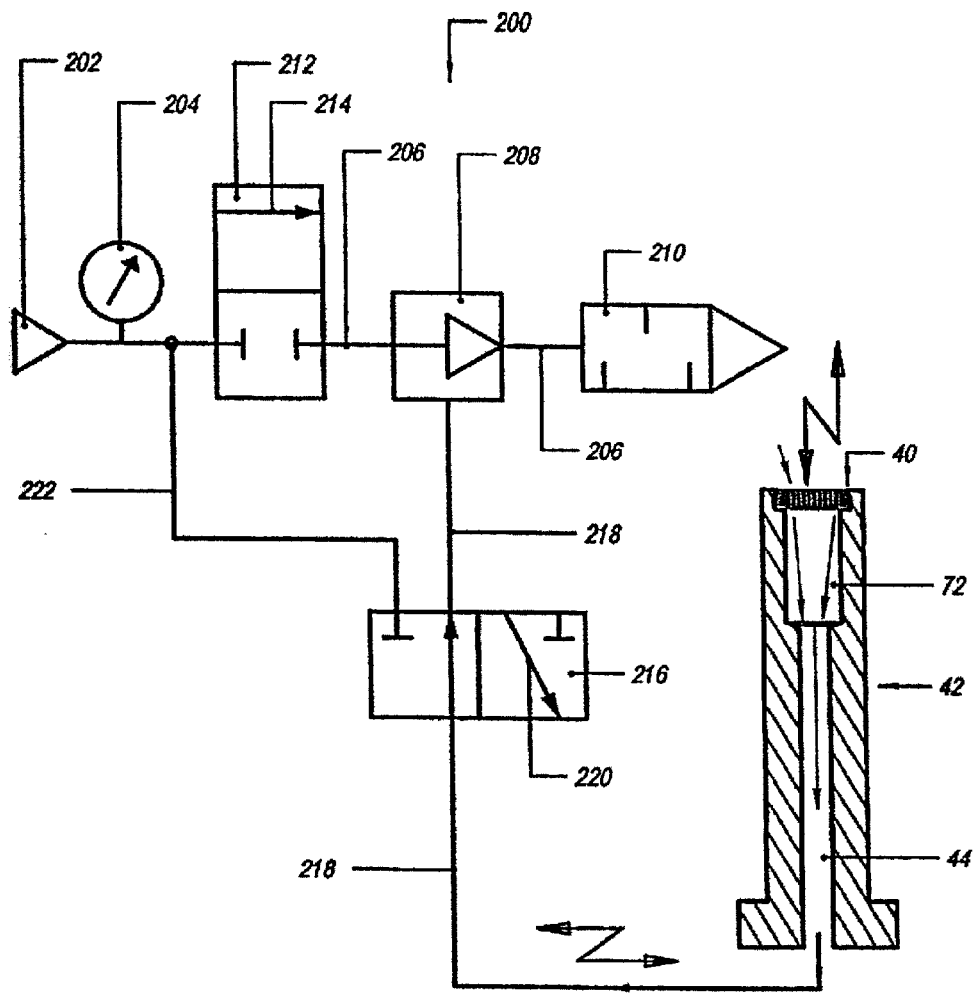
FIG. 22 is a schematic of a control system of this invention.

FIG. 22 illustrates a system 200 for evacuating air and gas from the mold cavity during molding. In one preferred embodiment, the system 200 comprises a source 202 of positive pressure that preferably is a positively pressurized pneumatic line or a line carrying another fluid. The magnitude of the pressure of the source 202 can be indicated using a gauge 204 or another measuring or display device. A conduit or line 206 leads from the source 202 to a vacuum source 208 that preferably is a vacuum pump, such as a venturi-type vacuum pump. If desired, the vacuum source can be a diaphragm pump, a rotary pump, a piston-type pump, or another type of vacuum source. If desired, gas or fluid from the source 202 can be vented into a sump or basin 210 such as an air muffler or another type of enclosure.

A first control valve 212 regulates flow through conduit 206 to the pump 208. When the valve 212 is disposed in a closed position, such as the closed position shown in FIG. 21, no gas flows to pump 208 and pump 208 is incapable of creating a useful vacuum. When the valve 212 is disposed in an open position, namely a position disposed away from the closed position shown in FIG. 22, such that arrow 214 aligns with conduit 206, gas from the source 202 flows to and preferably through the pump 208. Preferably, the valve 212 has at least two positions and can be a two-way valve that can be actuated by a solenoid or another actuator.

During operation, with a second control valve 216 disposed in an evacuation position (shown in FIG. 22), the vacuum pump 208 draws gas from the mold cavity 34 through conduit 218. In a preferred embodiment of the system 200, the conduit 218 communicates with a pin 42 to draw gas from the mold cavity 34 through a vent 40 in the pin 42. However, the vent 40 can be immovably fixed in a wall of the mold cavity 34, if desired.

The system 200 can be constructed and arranged to help eject a part that has been molded by directing a flow of gas through the conduit 218 and the vent 40 into the mold cavity 34. To accomplish this, the second control valve 216 has an eject position disposed away from its evacuation position such that diagonal line 220 extends from conduit 222 to conduit 218. Conduit 222 communicates with supply 202 such that when the valve 216 is disposed in the eject position, fluid, preferably gas under pressure, flows through conduit 222 and conduit 218 through vent 40 and into the mold cavity 34. Preferably, the valve 216 has at least two positions and can be a two-way valve that can be actuated by a solenoid or another actuator. In one preferred valve embodiment, the valve 216 is a three position or three way directional valve.

Although not shown, where valves 212 and 216 are solenoid actuated, operation of the solenoids preferably is controlled by circuitry, such as by timing circuitry, a programmable controller, or the like, that synchronizes opening and closing of the valves 212 and 216 in accordance with operation of the mold. For example, where it is desired to remove gas from the mold cavity 34, valve 212 is disposed in its open position and valve 216 is disposed in its evacuation position, and an appropriate solenoid for each valve is actuated, if needed. If desired, valve 212 can be moved to the closed position when hardenable material has completely or nearly completely filled the mold cavity 34. Where it is desired to help eject the molded part from the mold cavity 34, valve 212 is disposed in its closed position and valve 216 is disposed in its eject position. If desired, the valves 212 and 216 can be moved to their respective positions to facilitate part ejection when or after the mold halves have separated.

If desired, the system 200 can be used in this manner to introduce a fluid into the mold during molding. For example, an inert gas, such as nitrogen, carbon dioxide, argon, neon, another gas, or a combination of gases, can be introduced into the mold cavity, preferably for foam molding or expanded molding applications. Halogenated gases and low-molecular-weight alkanes can also be used. Other types of physical blowing agents (foaming agents) can also be used.

One example of a foam molding application where an inert gas is injected into the mold cavity 34 while the hardenable material is being introduced or has been introduced into the cavity 34 is molded expanded polystyrene foam molding. Another foam molding application where use of the method is suitable is plastic foam molding or structural foam molding. The gas is injected into the mold before the hardenable material solidifies.

In operation, with valve 212 in the closed position shown in FIG. 22 and valve 216 disposed in its eject position (i.e. away from its evacuation position shown in FIG. 22), gas from gas source 202 is introduced into the mold cavity through pin 42 and vent 40. Where a vent grate 70 of the construction shown in FIG. 3 is used, gas can be ejected through the slots in the grate 70 into the mold cavity. If desired, a grate or vent other than the vent grate 70 of the type shown in FIG. 3 can be used.

Figure 23:
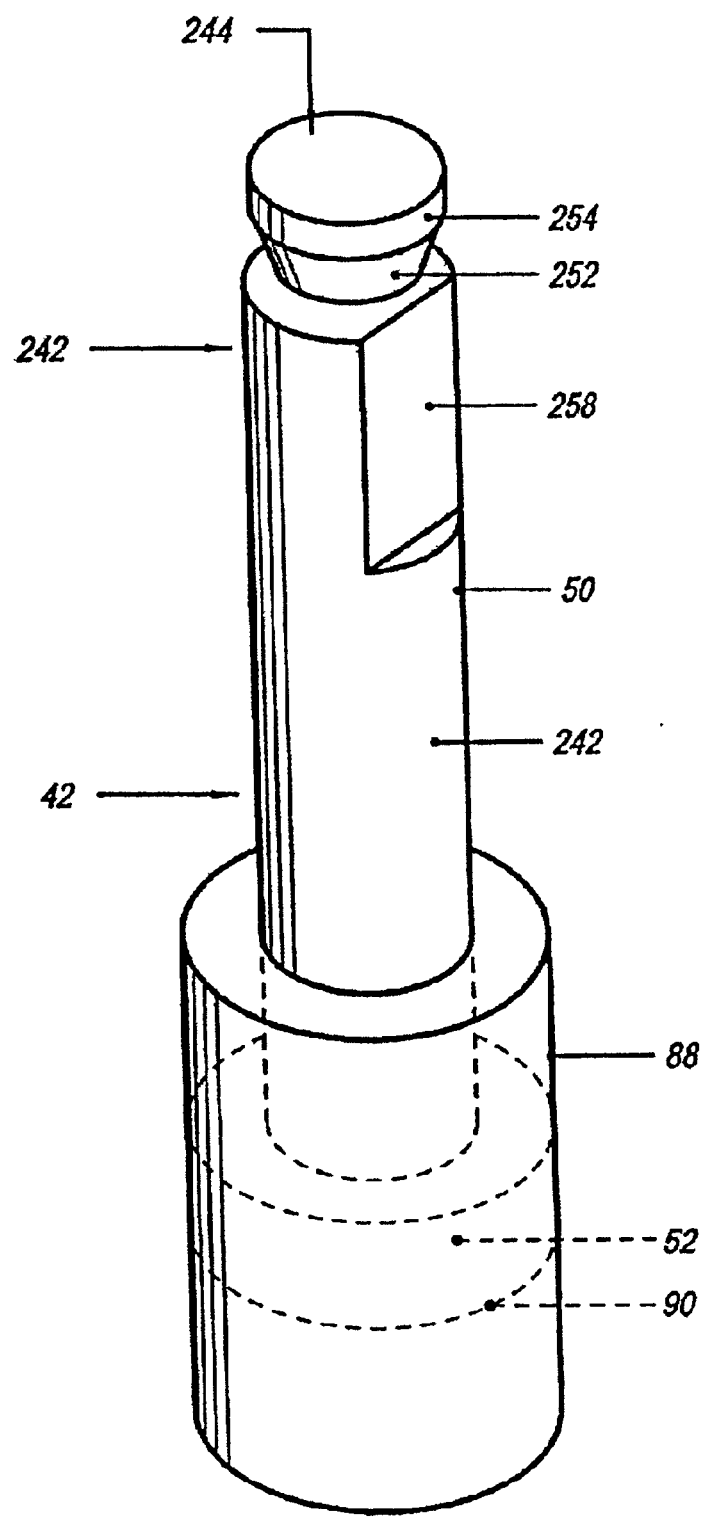
FIG. 23 is a perspective view of a movable pin having an integrally formed vent.

To facilitate introduction of the gas into the hardenable material being injected into the mold cavity, a pin carrying the vent 40, such as pin 42, preferably is extended into the cavity in the manner depicted in FIG. 23 such that the vent 40 is located above the surface 38 of the mold cavity. The pin 42 is extended into the mold cavity 34 while the material is still in its hardenable state and preferably is extended while hardenable material is being injected into the cavity. If desired, the pin 42 can be extended before and during injection of the hardenable material. So that the gas ejected from the vent 40 foams or expands the hardenable material in a desired manner, the vent 40 is preferably located in a mold stream of the hardenable material being introduced. For example, the pin 42 and vent 40 can be located near an inlet where the hardenable material is introduced into the mold cavity 34 such the amount of hardenable material being exposed to the injected gas is maximized.

In another preferred method, gas within the mold cavity 34 is vented through the vent 40 for a period of time until moldable material introduced into the cavity 34 reaches the vent 40. Thereafter, or after a set period of time during which the hardenable material is introduced into the cavity, a different gas, preferably one of the foam molding gases discussed above, is introduced through the vent 40 into the mold cavity 34. In this manner, the vent 40 and system 200 can be used to vent gas from the mold cavity and introduce gas into the cavity, even during the same mold cycle.

In another preferred method, a heated gas, vapor or fluid can be introduced into the mold cavity. More specifically, a heat transfer medium, such as steam, can be introduced into the mold to heat material in the mold to make it soft and moldable. For example, where beads of hardenable material are used, the system 200 can be used to inject the heat transfer medium into the mold cavity to heat beads of moldable material in the mold cavity to cause them to soften, expand (if expansion normally occurs), and preferably conform to the contours of the mold.

Advantageously, such a system 200 and vent 40 is versatile because it can be used (1) as a conventional ejector pin to eject a molded part from a mold cavity, (2) a gas ejector for ejecting a molded part from a mold cavity, (3) a vent for venting gas from the mold cavity during molding, (4) a gas injection system for foam and expanded molding, as well as a (5) a heat transfer medium heating system for heating moldable material in a mold.

Figure 24:
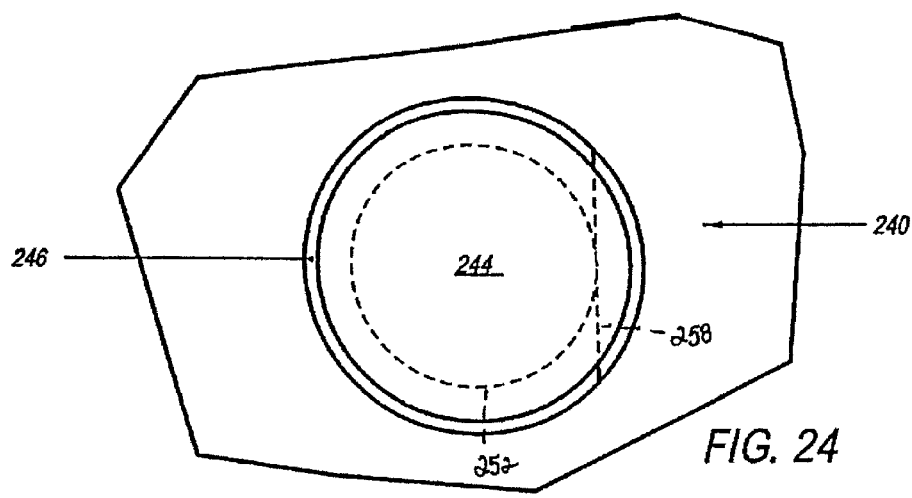
FIG. 24 is a top view of the pin vent disposed in a mold.
Figure 25:
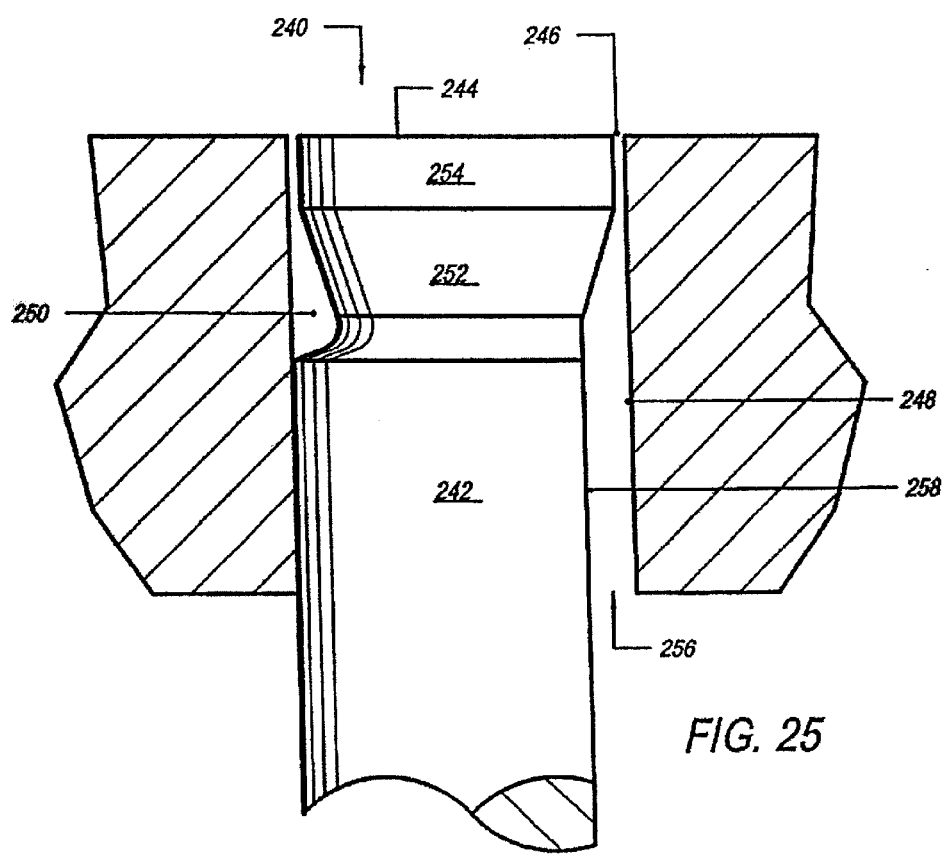
FIG. 25 depicts a side view with a portion of the mold cutaway to show the pin vent.

FIGS. 23–25 illustrate another preferred embodiment of a pin vent 240. The vent 240 includes a pin 242 with a vent head portion 244 having at least a portion of it machined or otherwise formed to be smaller than the rest of the barrel 50 axially spaced from the head 244. By this construction, the smaller vent head 244 provides clearance 246 between it and the sidewall or inner periphery 248 of the bore in which the pin 242 is received. The bore preferably is disposed in a mold cavity of one of the mold halves.

In a preferred embodiment, the vent head 244 is round and smaller in diameter than the diameter of the rest of the barrel 50 such that the barrel 50 is guided by the bore, but the smaller head 244 provides a clearance 246 between the head 244 and the bore sidewall 248 that defines the bore. The clearance 246 defines the mouth of the vent 240. The clearance 246 is selected to be large enough to allow gas in the mold to pass through the clearance 246 and out of the mold while being small enough to prevent the hardenable material filling the mold cavity from being drawn into the clearance 246. Preferably, the clearance 246 results in a spacing of no greater than about 0.005 inches and no less than about 0.0005 inches between the outer radius of the head 244 and the bore sidewall 248. Such a clearance size range is not trivial as it permits gas flow through the clearance 246 but opposes and preferably completely prevents hardenable material from flowing into and through the clearance 246.

In a preferred embodiment, the clearance 246 is continuous about the periphery of the head 244. If desired, the clearance 246 can be discontinuous. For example, the head 244 can be formed with one or more radially extending ridges or protrusions that can have about the same outer radial extent as the rest of the barrel 50.

Referring more specifically to FIG. 25, axially spaced from the head 244 is a recess 250 in the pin 242 that defines a chamber between the pin 242 and bore sidewall 248. In its preferred embodiment, the expansion chamber 250 includes a groove formed by a diametrically necked down portion 252 of the pin 242 adjacent the pin head 244. The function of the chamber 250 is to quickly decrease the pressure of gas vented through the clearance 246 to prevent any condensation or buildup from forming in the region of the clearance 246.

If desired, the diametrically necked down portion 252 can be axially spaced from the head 244 by an outer sidewall 254 that extends radially outwardly less than the radial outward extent of the pin barrel 50. Where the pin 242 has such a sidewall 254, the axial length of the sidewall 254 is no greater than about 0.060 inches to minimize surface area along which vented gas can condense.

The vent 240 further includes an axially extending vent passageway 256. In the preferred embodiment shown in FIGS. 23–25, the passageway 256 is disposed between the pin 242 and bore sidewall 254. If desired, the passageway 256 can be disposed in the mold, the pin 242, or a combination thereof. In the preferred embodiment shown, the passageway 256 is formed by an axially extending flat 258.

In operation, gas vented through the clearance 246 travels through chamber 250 to passageway 256 preferably where it is exhausted from the mold. When the component in the mold cavity is suitably hardened, the mold opens and the pin vent 240 is extended into the cavity. The axial end of the vent head 244 bears against the component urging the component away from the mold cavity surface thereby ejecting the component from the mold.

In a method of making the pin vent 240 or pin 42, bar stock is machined. An example of a suitable material that is preferred is H13 steel, as this material will prevent the pin from galling in the mold. Other suitable materials, including, for example, hardenable stainless steel, can be used. The bar stock is machined to form the venting features of the pin vent 240 including the vent head 244, any surface of the head 254, and any passages 252 or 254 leading away from the head 244 through which fluid will flow during vent operation. The barrel of the pin preferably is also be machined during this step.

After this machining step is completed, the entire partially finished pin vent 240 is semi-hardened by heat treatment to a hardness of about Rockwell C 30 to 50. Thereafter, the pin vent 240 is more precisely machined, preferably by centerless grinding, to impart a precise desired diameter to the barrel 50. The axial end of the vent head 244 is also ground flat.

Once the pin vent 240 has been precisely machined, the vent head 244 and barrel 50 are further hardened, preferably by nitriding. Thus, it is preferred that the bar stock be made of a nitridable material. Where the pin vent 240 is going to be cut to length later, enlarged portion 88 is not nitrided so it remains machinable. By leaving the enlarged portion 88 machinable, the length 90 can be precisely cut for the mold in which it will be assembled.

The pin vent 240 can be made in standard ejector pin sizes of 3/16 of an inch, 3/8 of an inch, 1/4 of an inch, 5/16 of an inch, 1/2 of an inch, etc. The pin vent 240 can be as long as one inch or longer, if desired.

It is also to be understood that, although the foregoing description and drawings describe and illustrate in detail preferred embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims.

What is claimed is:

1. A pin vent for a mold equipped with a mold cavity, the pin vent comprising a reciprocable pin disposed in a bore in the mold that has a vent orifice disposed in one end of the pin that is exposed to the mold cavity, a vent passage that communicates with the vent orifice, a perforate insert that is received in the vent orifice, and wherein a portion of the pin bounding the perforate insert is deformed against the perforate insert to retain the perforate insert.

2. The pin vent of claim 1 wherein the perforate insert comprises a perforate grate that is comprised of a plurality of interlocking vent grate sections.

3. A pin vent for a mold comprising
a reciprocable pin that has a vent orifice disposed in one end of the pin and a vent passage in the pin that communicates with the vent orifice;
a disc-shaped perforate insert that comprises a grate; and
wherein the perforate insert is received in a pocket in the one end of the pin and bounded by a lip of the pin that is deformed against the perforate insert to retain the insert.

4. The pin vent of claim 3 wherein the perforate insert has a sidewall with an outward taper that opposes removal of the perforate insert.

5. A pin vent for a mold comprising:
a reciprocable pin that has a vent orifice; and
a perforate vent grate carried by the pin in line with the vent orifice, the vent grate comprised of a plurality vent grate halves with each one of the vent grate halves having a plurality of spaced apart fingers with the fingers of one of the vent grate halves disposed between the fingers of another one of the vent grate halves defining a plurality of vent grate slots therebetween when the vent grate halves are assembled together.

6. The pin vent of claim 5 wherein one of the halves has a key and the other one of the halves has a keyway that receives the key of the one of the halves when the two halves are assembled together.

7. The pin vent of claim 1 wherein the vent passage is disposed between an outer sidewall of the pin and a portion of the mold adjacent the pin.

8. The pin vent of claim 1 wherein the perforate insert comprises a vent grate that has a plurality of vent perforations with each vent perforation having a opening that is exposed to the mold cavity and a discharge located downstream of the opening that is in communication with the vent passage, and wherein, for each one of a plurality of vent perforations, the discharge is larger in width than the opening.

9. The pin vent of claim 1 wherein the vent passage is disposed in an outer sidewall of the pin and extends generally in an axial direction.

10. The pin vent of claim 9 wherein the vent passage comprises a channel formed in the outer sidewall of the pin that is generally helical.

11. The pin vent of claim 1 wherein the vent passage further comprises a generally radially extending port.

12. The pin vent of claim 1 wherein the vent orifice includes a port that extends radially to communicate gas or vapor being vented from the vent grate to the vent passage, and wherein the vent passage is defined by a portion of an outer sidewall of the pin and extends in a generally axial direction.

13. The pin vent of claim 1 wherein the perforate insert comprises a vent grate that has a plurality of through-slots with each slot defined by a pair of sidewalls that taper away from each other such that a mouth of each slot that is exposed to the mold cavity is narrower than a discharge of the slot that is located downstream of the mouth with a throat disposed between the mouth and the discharge that has a depth of three to five times a minimum width of the slot.

14. A vent for a mold comprising:
(a) a first vent grate half having a plurality of spaced apart fingers that extend outwardly from a web with the web and fingers defining a vent grate half of one-piece and unitary construction;
(b) a second vent grate half having a finger that extends outwardly from a web with the web and finger defining a vent grate half of one-piece and unitary construction;

(c) wherein the first vent grate half engages the second vent grate half with the finger of the second vent grate half disposed between the plurality of the fingers of the first vent grate half thereby defining a plurality of vent slots; and (d) wherein the first vent grate half and second vent grate half form a disc-shaped vent insert when engaged.

15. The vent of claim 14 wherein the web of the first vent grate half is arcuately shaped, the web of the second vent grate half is arcuately shaped, and the first vent grate half and the second vent grate half form a round disc-shaped vent grate insert when the first vent grate half is engaged with the second vent grate half.

16. The vent of claim 15 further comprising a reciprocable pin that carries the vent and the engaged vent grate halves form an insert that is disposed in a bore in the pin.

17. A vent for a mold having a mold cavity that is used to form a hardenable material, the vent comprising a perforate insert that is disposed in a bore in the mold, the insert having a plurality of spaced apart vent slots that each have a mouth disposed in the mold cavity and a discharge downstream of the mouth, wherein each slot is defined by a plurality of sidewalls that taper away from each other such that the discharge of each slot is wider than the mouth.

18. The vent of claim 17 wherein each one of the slots has a throat between its mouth and its discharge that has an axial length of three to five times the width of the mouth.

19. A vent disposed in a passageway in a mold having a mold cavity used to form hardenable material comprising:

a first grate portion and a second grate portion that engage each other to form a vent grate;

wherein one of the grate portions has a first vent grate finger that projects outwardly toward the other one of the grate portions, and the other one of the grate portions has a second vent grate finger that projects outwardly toward the one of the grate portions and that is adjacent the first vent grate finger;

wherein the first vent grate finger and the second vent grate finger define a vent passage therebetween; and wherein at least one of the vent grate fingers of one of the grate portions has a tip with an inclined end that is supported on a complementarily inclined wall of the other one of the grate portions during molding.

20. The vent of claim 19 wherein the hardenable material comprises plastic, the first grate and second grate form a perforate vent grate insert that is disc-shaped, and each vent passage comprises a slot that has a mouth with a minimum width of between 0.005 inches and 0.0005 inches for permitting gas or vapor to flow therethrough while opposing flow of plastic.

21. The vent of claim 19 wherein each vent passage has a slot-shaped mouth that opens in the mold cavity and that communicates with a downstream vent passage chamber therein that is defined by sidewalls that taper outwardly such that the vent passage chamber widens downstream from the slot-shaped mouth.

22. A vent insert disposed in a passageway in a mold having a mold cavity used in forming hardenable material comprising:

a first grate portion and a second grate portion with one of the grate portions having a keyway and the other one of the grate portions having a key that is received in the keyway to interlock the first and second grate portions defining a vent grate, wherein one of the grate portions has first and second spaced apart vent grate fingers that each project outwardly toward the other one of the grate portions, and the other one of the grate portions having a third vent grate finger that projects outwardly toward the one of the grate portions and that is disposed between the first and second vent grate fingers, wherein the first vent grate finger and the third vent grate finger defines a first vent passage therebetween and the second vent grate finger and the third vent grate finger define a second vent passage therebetween, wherein each one of the vent grate fingers of one of the grate portions have a tip with an inclined end that is supported on a complementarily inclined wall of the other one of the grate portions, and wherein each vent passage has an opening that communicates with a chamber in the vent passage that has sidewalls that taper away from each other such that the vent passage chamber widens as it extends away from its opening.

23. The pin vent of claim 5 wherein one of the fingers further comprises a tab disposed in one of the vent passages that extends outwardly from the one of the fingers toward an adjacent one of the fingers to space the adjacent one of the fingers away from the one of the fingers.

24. The vent of claim 14 wherein one of the fingers further comprises an integral tab disposed in one of the vent passages that extends outwardly from the one of the fingers toward an adjacent one of the fingers spacing the adjacent one of the fingers away from the one of the fingers.

25. A pin vent for a mold comprising:

a reciprocable pin that has a vent orifice disposed in one end of the pin;

a perforate insert disposed in the vent orifice; and wherein the pin has a lip that is deformed against the perforate insert to retain the insert in the vent orifice.

26. The pin vent of claim 25 wherein the vent orifice further comprises a pocket in the one end of the pin, the perforate insert is disposed in the pocket, and the lip bounds the perforate insert.

27. The pin vent of claim 25 wherein the lip encircles the vent orifice and the perforate insert comprises a disc-shaped perforate grate that is round.

28. The pin vent of claim 25 wherein the pin comprises an ejector pin.

29. A pin vent for a mold comprising:

a reciprocable pin that has a vent orifice disposed in one end of the pin;

a perforate insert disposed in the vent orifice that has a top, a bottom and an outer sidewall that tapers from top to bottom such that it is wider adjacent the bottom; and wherein the pin is deformed against the sidewall of the perforate insert adjacent the top of the perforate insert retaining the perforate insert in the vent orifice.

30. A pin vent for a mold comprising:

a reciprocable ejector pin that has a vent orifice disposed in one end of the pin and a vent passage leading to the vent orifice;

a round perforate insert disposed in the vent orifice that has a top, a bottom and an outer sidewall that tapers from top to bottom such that it is wider adjacent the bottom; and wherein the pin comprises a lip bounding the vent orifice that encircles the perforate insert which is deformed against the sidewall of the perforate insert above the bottom of the perforate insert retaining the perforate insert in the vent orifice.

31. A pin vent for a mold comprising:

a reciprocable ejector pin that has a circular vent orifice disposed in one end of the pin that is defined by an endless inner sidewall and a vent passage in the pin that leads to the vent orifice;

a round perforate vent grate that has a top, a bottom, an outer sidewall that diametrically enlarges from top to bottom such that it is diametrically larger at the bottom than at the top, and a plurality of pairs of parallel and spaced apart fingers with each pair of adjacent fingers defining an elongate vent slot therebetween that extends from the top to the bottom completely through the perforate vent grate, the perforate vent grate disposed in the vent orifice with its top substantially flush with the one end of the ejector pin; and wherein a portion of the endless inner sidewall of the pin is deformed against the outer sidewall of the perforate vent grate above the bottom of the perforate vent grate to retain the perforate vent grate in the vent orifice.

32. A pin vent for a mold comprising:

a reciprocable pm that has a vent orifice that communicates with a vent passage; and a perforate vent grate disposed in line with the vent orifice, the vent grate comprised of a plurality vent grate sections that each have a plurality of spaced apart fingers with the fingers of one of the vent grate sections disposed between the fingers of another one of the vent grate sections defining a plurality of elongate vent grate slots therebetween.

33. A pin vent for a mold comprising:

a reciprocable ejector pin that has a vent orifice formed in its free end that communicates with a vent passage; and a perforate vent grate disposed in the vent orifice that has a top, a bottom, an outer sidewall that tapers from top to bottom such that it is wider at the bottom than at the top, the perforate vent grate comprised of a plurality vent grate halves with one of the vent grate halves having a plurality of spaced apart fingers and another one of the vent grate halves having a finger that is disposed between the plurality of fingers of the one of the vent grate halves defining a plurality of elongate vent grate slots therebetween;

wherein one of the vent grate halves comprises a key and another one of the vent grate halves has a keyway that receives the key of the one of the vent grate halves to engage the vent grate halves; and wherein the pin has a lip that bounds the vent orifice and encircles the perforate vent grate that is deformed against the outer sidewall of the perforate vent grate adjacent the top of the perforate vent grate.

34. A mold vent comprising:

a first grate portion and a second grate portion that engage to form a vent grate;

wherein one of the grate portions has a first finger that projects outwardly toward the other one of the grate portions, and the other one of the grate portions has a second finger that projects outwardly toward the one of the grate portions and that is adjacent the first finger;

wherein the first finger and the second finger define an elongate vent slot therebetween; and wherein at least one of the fingers includes an integral tab disposed in the vent slot that extends outwardly toward another one of the fingers maintaining spacing between the fingers.

35. A mold vent comprising:

a first grate section and a second grate section with one of the first and second grate sections comprised of a key that is received in a keyway formed in the other one of the first and second grate sections defining a vent grate;

wherein one of the grate sections has a first finger and second finger that both project outwardly toward the other one of the grate sections, and the other one of the grate sections has a third finger that projects outwardly toward the one of the grate sections and that is disposed between the first finger and the second finger; and wherein the first finger and the third finger define a first vent passage therebetween and the second finger and the third finger define a second vent passage therebetween.

36. A mold vent comprising a first grate section and a second grate section with one of the first and second grate sections comprised of a key that is received in a keyway formed in the other one of the first and second grate sections defining a vent grate, wherein each one of the grate sections comprises a plurality of parallel fingers with each finger of one of the vent grate sections extending toward the other one of the vent grate sections and disposed alongside one of the fingers of the other one of the vent grate sections defining an elongate vent slot therebetween with each one of the fingers including a generally transversely extending tab disposed in one of the vent slots toward an adjacent one of the fingers.

37. A vent for a mold having a mold cavity that is used to form a hardenable material, the vent comprising a perforate insert that is disposed in a bore in the mold, the insert having a plurality of spaced apart vent slots that each have a mouth disposed in the mold cavity and a discharge downstream of the mouth, wherein each slot is defined by a plurality of sidewalls that taper away from each other such that the discharge of each slot is wider than the mouth wherein each one of the slots has a throat between its mouth and its discharge that has an axial length of three to five times the width of the mouth.

38. A mold vent comprising:

a first grate half and a second grate half that engage and form a vent grate;

wherein one of the grate halves comprises first and second spaced apart and parallel fingers that each project outwardly toward the other one of the grate halves, and the other one of the grate halves comprises a third vent grate finger that projects outwardly toward the one of the grate halves and that is disposed between the first and second vent grate fingers;

wherein the first vent grate finger and the third vent grate finger defines a first elongate vent slot therebetween and the second vent grate finger and the third vent grate finger define a second elongate vent slot therebetween; and wherein each vent slot includes an opening that communicates with a chamber downstream of the opening that is defined by adjacent finger sidewalls that taper away from each other such that the vent slot chamber widens in a direction downstream from the vent slot opening.

39. A mold vent comprising:

a first grate half and a second grate half with one of the grate halves comprising a key that is received in a keyway to engage the vent grate halves;

wherein one of the grate halves has first and second spaced apart parallel fingers that each project outwardly toward the other one of the grate halves, and the other one of the grate halves has a third vent grate finger that projects outwardly toward the one of the grate halves and that is disposed between the first and second vent grate fingers;

wherein the first vent grate finger and the third vent grate finger defines a first elongate vent slot therebetween and the second vent grate finger and the third vent grate finger define a second elongate vent slot therebetween; and wherein each finger has an integrally formed spacer that extends outwardly therefrom into one of the vent slots toward an adjacent finger.

40. A mold vent comprising:

a first grate half and a second grate half with one of the grate halves comprising a key that is received in a keyway to engage the vent grate halves;

wherein one of the grate halves has first and second spaced apart parallel fingers that each project outwardly toward the other one of the grate halves, and the other one of the grate halves has a third vent grate finger that projects outwardly toward the one of the grate halves and that is disposed between the first and second vent grate fingers;

wherein the first vent grate finger and the third vent grate finger define a first elongate vent slot therebetween and the second vent grate finger and the third vent grate finger define a second elongate vent slot therebetween; and wherein the first finger and the second finger of the one of the grate halves each have an end that is supported by the other one of the grate halves and the third finger of the other one of the grate halves is supported by the other one of the grate halves.

41. A mold vent comprising:

a first grate half and a second grate half with one of the grate halves comprising a key that is received in a keyway to engage the vent grate halves;

wherein one of the grate halves has first and second spaced apart parallel fingers that each project outwardly toward the other one of the grate halves, and the other one of the grate halves has a third vent grate finger that projects outwardly toward the one of the grate halves and that is disposed between the first and second vent grate fingers;

wherein the first vent grate finger and the third vent grate finger define a first elongate vent slot therebetween and the second vent grate finger and the third vent grate finger define a second elongate vent slot therebetween;

wherein the first finger and the second finger of the one of the grate halves each have an end that is supported by the other one of the grate halves and the third finger of the other one of the grate halves is supported by the other one of the grate halves; and wherein each finger has an integrally formed spacer that extends outwardly therefrom into one of the vent slots toward an adjacent finger.

42. A mold vent comprising:

a first grate half and a second grate half with one of the grate halves comprising a key that is received in a keyway to engage the vent grate halves;

wherein one of the grate halves has first and second spaced apart parallel fingers that each project outwardly toward the other one of the grate halves, and the other one of the grate halves has a third vent grate finger that projects outwardly toward the one of the grate halves and that is disposed between the first and second vent grate fingers;

wherein the first vent grate finger and the third vent grate finger define a first elongate vent slot therebetween and the second vent grate finger and the third vent grate finger define a second elongate vent slot therebetween;

wherein the first finger and the second finger of the one of the grate halves each have an end that is supported by the other one of the grate halves and the third finger of the other one of the grate halves is supported by the other one of the grate halves;

wherein each finger has an integrally formed spacer that extends outwardly therefrom into one of the vent slots toward an adjacent finger; and wherein each vent slot includes an opening that communicates with a chamber downstream of the opening that is defined by adjacent finger sidewalls that taper away from each other such that the vent slot chamber widens in a direction downstream from the vent slot opening.

* * * * *